(12) United States Patent
Martin et al.

(10) Patent No.: US 11,672,377 B2
(45) Date of Patent: *Jun. 13, 2023

(54) COOKING DEVICE AND COMPONENTS THEREOF

(71) Applicant: SHARKNINJA OPERATING LLC, Needham, MA (US)

(72) Inventors: Christopher T. Martin, North Attleboro, MA (US); Thomas Guerin, Boston, MA (US); Roger Neil Jackson, Cornwall (GB); Joshua D. Anthony, North Billerica, MA (US); Kerry Schwarz, Needham, MA (US); Michaela Dubeau, Uxbridge, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,768

(22) Filed: Jun. 10, 2022

(65) Prior Publication Data

US 2022/0296039 A1    Sep. 22, 2022

Related U.S. Application Data

(63) Continuation of application No. 17/219,238, filed on Mar. 31, 2021, now Pat. No. 11,389,026, which is a
(Continued)

(51) Int. Cl.
*A47J 37/06* (2006.01)
*A47J 27/00* (2006.01)
*A47J 27/12* (2006.01)

(52) U.S. Cl.
CPC ......... *A47J 37/0641* (2013.01); *A47J 27/004* (2013.01); *A47J 27/12* (2013.01); *A47J 37/0664* (2013.01)

(58) Field of Classification Search
CPC ........ A47J 37/0641; A47J 27/00; A47J 27/08; A47J 27/09; A47J 27/092; A47J 36/025;
(Continued)

(56) References Cited

U.S. PATENT DOCUMENTS

| 5,832,812 A | 11/1998 | Wolfe et al. |
| 6,545,251 B2 | 4/2003 | Allera et al. |

(Continued)

FOREIGN PATENT DOCUMENTS

| CN | 202665302 U | 1/2013 |
| CN | 105615640 A | 6/2016 |

(Continued)

OTHER PUBLICATIONS

U.S. Appl. No. 17/159,414, filed Jan. 27, 2021, Cooking Device and Components Thereof.
(Continued)

*Primary Examiner* — Phuong T Nguyen
(74) *Attorney, Agent, or Firm* — Mintz Levin Cohn Ferris Glovsky and Popeo, PC

(57) ABSTRACT

A cooking system includes a housing having at least one internal compartment and a cooking container receivable within said at least one internal compartment. A cooking volume is defined within an interior of said cooking container. A bottom surface of said cooking container is angled upwardly. A heating element is associated with said at least one internal compartment.

22 Claims, 15 Drawing Sheets

Related U.S. Application Data continuation of application No. 17/159,414, filed as application No. PCT/US2020/042120 on Jul. 15, 2020.

(60) Provisional application No. 62/874,193, filed on Jul. 15, 2019.

(58) Field of Classification Search
CPC .. A47J 36/06; A47J 36/08; A47J 36/10; A47J 36/12; A47J 36/165; A47J 36/18; A47J 36/20; A47J 36/22; A47J 37/00; A47J 37/12; A47J 37/1204; A47J 37/1209; A47J 37/1214; A47J 37/1219; A47J 37/1266; A47J 37/1285; A47J 37/129; A47J 37/1295
USPC .......... 99/324, 325, 330–343, 369, 400–418, 99/422, 425, 426, 430, 440, 444, 447, 99/448, 449, 451, 483, 495, 501
See application file for complete search history.

(56) References Cited

U.S. PATENT DOCUMENTS

| | | |
|---|---|---|
| 6,593,552 B1 | 7/2003 | Li |
| 6,653,602 B2 | 11/2003 | Li |
| 6,758,206 B1 | 7/2004 | Barnes et al. |
| 6,761,159 B1 | 7/2004 | Barnes et al. |
| 6,878,904 B2 | 4/2005 | Verveniotis |
| 6,917,017 B2 | 7/2005 | Moon et al. |
| 7,064,297 B2 | 6/2006 | Tidey |
| 7,105,778 B1 | 9/2006 | Delong et al. |
| 7,105,779 B2 | 9/2006 | Shei |
| 7,117,866 B2 | 10/2006 | Cantal |
| 7,227,102 B2 | 6/2007 | Shei |
| 7,238,921 B2 | 7/2007 | Beesley et al. |
| 7,250,587 B2 | 7/2007 | Ely et al. |
| 7,250,588 B2 | 7/2007 | Ely et al. |
| 7,297,905 B2 | 11/2007 | Kim et al. |
| 7,328,654 B2 | 2/2008 | Shei |
| 7,339,140 B2 | 3/2008 | Tidey |
| 7,442,901 B2 | 10/2008 | Kim et al. |
| 7,703,389 B2 | 4/2010 | McLemore et al. |
| 8,006,685 B2 | 8/2011 | Bolton et al. |
| 8,035,062 B2 | 10/2011 | McFadden et al. |
| 8,096,231 B2 | 1/2012 | Veltrop et al. |
| 8,212,188 B2 | 7/2012 | Kim et al. |
| 8,217,314 B2 | 7/2012 | Kim et al. |
| 8,274,020 B2 | 9/2012 | Donarski et al. |
| 8,378,265 B2 | 2/2013 | Greenwood et al. |
| 8,389,907 B2 | 3/2013 | Willett |
| 8,404,292 B2 | 3/2013 | Veltrop et al. |
| D688,513 S | 8/2013 | Garman |
| 8,517,006 B2 | 8/2013 | Frock et al. |
| D695,058 S | 12/2013 | Garman |
| 8,640,608 B2 | 2/2014 | Volatier |
| 8,669,500 B2 | 3/2014 | Hensel et al. |
| 8,720,323 B2 | 5/2014 | Douglas et al. |
| 8,735,778 B2 | 5/2014 | Greenwood et al. |
| 8,748,783 B2 | 6/2014 | Hensel et al. |
| 8,883,234 B2 | 11/2014 | Choi |
| 8,895,902 B2 | 11/2014 | Shei et al. |
| D724,890 S | 3/2015 | Molnar et al. |
| 8,993,026 B2 | 3/2015 | Molnar et al. |
| 9,021,942 B2 | 5/2015 | Lee et al. |
| 9,072,403 B2 | 7/2015 | Braden et al. |
| 9,074,776 B2 | 7/2015 | Greenwood et al. |
| 9,080,774 B2 | 7/2015 | Kim et al. |
| 9,115,904 B2 | 8/2015 | Bringe et al. |
| 9,192,262 B2 | 11/2015 | Kanbur et al. |
| 9,314,134 B2 | 4/2016 | Molnar |
| 9,326,639 B2 | 5/2016 | McKee et al. |
| 9,351,495 B2 | 5/2016 | Mcfadden |
| 9,370,275 B2 | 6/2016 | Jackson et al. |
| 9,404,661 B2 | 8/2016 | Kim et al. |
| 9,433,321 B2 | 9/2016 | Piazzi |
| 9,462,912 B2 | 10/2016 | Jackson et al. |
| 9,480,364 B2 | 11/2016 | Mckee et al. |
| 9,482,437 B2 | 11/2016 | Kemper |
| 9,504,351 B2 | 11/2016 | Cadima |
| 9,534,791 B2 | 1/2017 | Wie et al. |
| 9,534,794 B2 | 1/2017 | Rogers et al. |
| 9,541,295 B2 | 1/2017 | Adelmann et al. |
| 9,568,200 B2 | 2/2017 | Moon et al. |
| 9,618,212 B2 | 4/2017 | Schootstra et al. |
| 9,635,979 B2 | 5/2017 | Abrams et al. |
| 9,661,952 B2 | 5/2017 | Jackson et al. |
| 9,668,615 B2 | 6/2017 | Contarino, Jr. |
| 9,671,114 B2 | 6/2017 | Braden et al. |
| 9,677,774 B2 | 6/2017 | McKee et al. |
| 9,681,773 B2 | 6/2017 | McKee et al. |
| 9,693,655 B2 | 7/2017 | Shei et al. |
| 9,702,564 B2 | 7/2017 | Park et al. |
| 9,723,954 B2 | 8/2017 | Bringe et al. |
| 9,746,189 B2 | 8/2017 | Kantas |
| 9,759,430 B2 | 9/2017 | Jadhav et al. |
| 9,759,432 B2 | 9/2017 | Chung et al. |
| 9,788,687 B2 | 10/2017 | Frehn et al. |
| 9,795,250 B2 | 10/2017 | Huang |
| 9,803,873 B2 | 10/2017 | Rowley et al. |
| 9,863,645 B2 | 1/2018 | Adelmann et al. |
| 9,874,354 B2 | 1/2018 | Jadhav et al. |
| 9,879,865 B2 | 1/2018 | McKee et al. |
| 9,900,936 B2 | 2/2018 | Imm et al. |
| 9,903,598 B2 | 2/2018 | Greenwood et al. |
| 9,974,312 B2 | 5/2018 | McKee et al. |
| 9,976,750 B1 | 5/2018 | Kestner et al. |
| 9,980,322 B1 | 5/2018 | Kestner et al. |
| 9,980,606 B2 | 5/2018 | Marra |
| 9,993,111 B2 | 6/2018 | Thorndyke |
| 10,045,651 B2 | 8/2018 | Huang |
| 10,051,997 B2 | 8/2018 | Contarino, Jr. |
| 10,088,173 B2 | 10/2018 | Mckee et al. |
| 10,094,576 B2 | 10/2018 | Kim et al. |
| 10,099,839 B2 | 10/2018 | Schoning |
| 10,101,038 B2 | 10/2018 | Kim et al. |
| 10,113,749 B2 | 10/2018 | Yancey |
| 10,143,324 B2 | 12/2018 | Kataoka et al. |
| 10,174,953 B2 | 1/2019 | Jadhav et al. |
| 10,190,783 B2 | 1/2019 | Rogers et al. |
| 10,203,117 B2 | 2/2019 | Moon et al. |
| 10,234,144 B2 | 3/2019 | Deshpande |
| 10,247,424 B2 | 4/2019 | Adelmann et al. |
| 10,271,686 B2 | 4/2019 | Roy |
| 10,271,690 B2 | 4/2019 | Veltrop et al. |
| 10,285,531 B2 | 5/2019 | Chanowitz |
| 10,309,659 B2 | 6/2019 | Moon et al. |
| 10,337,745 B2 | 7/2019 | Mckee et al. |
| 10,364,990 B2 | 7/2019 | Lee |
| 10,364,991 B2 | 7/2019 | Kang et al. |
| 10,383,477 B2 | 8/2019 | Payen et al. |
| 10,390,656 B2 | 8/2019 | Gill et al. |
| 10,405,696 B2 | 9/2019 | Kim |
| 10,405,697 B2 | 9/2019 | Gill et al. |
| 10,405,698 B2 | 9/2019 | Gill et al. |
| 10,405,699 B2 | 9/2019 | Contarino, Jr. |
| 10,413,121 B2 | 9/2019 | Gill et al. |
| 10,413,122 B2 | 9/2019 | Gill et al. |
| 10,426,176 B2 | 10/2019 | Dixon et al. |
| 10,448,785 B2 | 10/2019 | Van Der Weij |
| 10,448,786 B2 | 10/2019 | Van Der Burg et al. |
| 10,451,285 B2 | 10/2019 | Dumenil |
| 10,492,641 B2 | 12/2019 | Kestner et al. |
| 10,495,319 B2 | 12/2019 | Lee et al. |
| 10,495,320 B2 | 12/2019 | Torrentes et al. |
| 10,502,433 B2 | 12/2019 | Park et al. |
| 10,512,363 B2 | 12/2019 | Kestner et al. |
| 10,524,615 B2 | 1/2020 | Reales Bertomeo et al. |
| 10,598,391 B2 | 3/2020 | Padula |
| 10,619,862 B2 | 4/2020 | Bruin-Slot et al. |
| 10,627,116 B2 | 4/2020 | Bruin-Slot et al. |
| 10,638,882 B1 | 5/2020 | He et al. |
| 10,660,471 B2 | 5/2020 | Kim et al. |
| 10,674,853 B2 | 6/2020 | Huang |

(56) References Cited

U.S. PATENT DOCUMENTS

| | | | |
|---|---|---|---|
| 10,674,854 B2 | 6/2020 | Huang | |
| 10,684,022 B2 | 6/2020 | McKee et al. | |
| 10,694,753 B2 | 6/2020 | Reese et al. | |
| 10,694,882 B2 | 6/2020 | Huang | |
| 10,712,018 B2 | 7/2020 | Adelmann et al. | |
| 10,729,144 B2 | 8/2020 | McKee et al. | |
| 10,731,865 B2 | 8/2020 | Jadhav et al. | |
| 10,743,709 B2 | 8/2020 | Nie | |
| 10,743,710 B2 | 8/2020 | Frehn et al. | |
| 10,794,599 B2 | 10/2020 | Jang et al. | |
| 10,835,077 B2 | 11/2020 | Nie | |
| 10,841,981 B1 | 11/2020 | Kestner et al. | |
| 10,849,457 B2 | 12/2020 | Bell | |
| 10,852,002 B1 | 12/2020 | Kestner et al. | |
| 10,865,994 B2 | 12/2020 | Lee et al. | |
| 10,881,246 B2 | 1/2021 | He et al. | |
| 10,883,721 B2 | 1/2021 | Paller | |
| 10,887,952 B2 | 1/2021 | Peterson | |
| 10,890,336 B2 | 1/2021 | Mckee et al. | |
| 10,890,372 B2 | 1/2021 | Hanning | |
| 10,914,473 B2 | 2/2021 | Kim et al. | |
| 10,918,112 B2 | 2/2021 | Bigott et al. | |
| 10,920,992 B2 | 2/2021 | Kobayashi et al. | |
| 11,045,046 B1 | 6/2021 | Man | |
| 11,297,977 B1 | 4/2022 | Man | |
| 2009/0126580 A1* | 5/2009 | Hartfelder | A47J 39/006 99/483 |
| 2012/0272832 A1* | 11/2012 | Kwon | A21B 1/00 99/324 |
| 2012/0321770 A1 | 12/2012 | Pelle | |
| 2016/0029829 A1 | 2/2016 | Klein | |
| 2016/0209028 A1 | 7/2016 | Jang | |
| 2016/0220057 A1 | 8/2016 | Smith et al. | |
| 2017/0071408 A1 | 3/2017 | Veltrop et al. | |
| 2017/0079473 A1 | 3/2017 | Bigott | |
| 2017/0231430 A1 | 8/2017 | Moon et al. | |
| 2017/0245683 A1 | 8/2017 | Chen et al. | |
| 2017/0251859 A1 | 9/2017 | Mundt | |
| 2018/0073746 A1 | 3/2018 | Jang et al. | |
| 2018/0220500 A1 | 8/2018 | Staton et al. | |
| 2018/0220842 A1 | 8/2018 | Delrue et al. | |
| 2018/0255971 A1 | 9/2018 | Moon et al. | |
| 2018/0259194 A1 | 9/2018 | Won et al. | |
| 2018/0303285 A1 | 10/2018 | Cheng | |
| 2018/0352612 A1 | 12/2018 | Hofleitner et al. | |
| 2019/0045590 A1 | 2/2019 | Kunimoto et al. | |
| 2019/0063123 A1 | 2/2019 | Ham et al. | |
| 2019/0137111 A1 | 5/2019 | Kobayashi et al. | |
| 2019/0170368 A1 | 6/2019 | Rogers et al. | |
| 2019/0208956 A1 | 7/2019 | Chen et al. | |
| 2019/0239517 A1 | 8/2019 | Mckee et al. | |
| 2019/0242590 A1 | 8/2019 | Colozzo et al. | |
| 2019/0246835 A1 | 8/2019 | Tsai | |
| 2019/0246836 A1 | 8/2019 | Du et al. | |
| 2019/0246841 A1 | 8/2019 | Veltrop et al. | |
| 2019/0254473 A1 | 8/2019 | Anthony et al. | |
| 2019/0254474 A1 | 8/2019 | Anthony et al. | |
| 2019/0254476 A1 | 8/2019 | Anthony et al. | |
| 2019/0254479 A1 | 8/2019 | De' Longhi et al. | |
| 2019/0269276 A1 | 9/2019 | Gvili | |
| 2019/0282029 A1 | 9/2019 | Goldberg | |
| 2019/0290062 A1 | 9/2019 | Prieto et al. | |
| 2019/0290072 A1 | 9/2019 | Prieto et al. | |
| 2019/0298104 A1 | 10/2019 | Balsamo et al. | |
| 2019/0298105 A1 | 10/2019 | Floessholzer | |
| 2019/0298106 A1 | 10/2019 | Cichosz | |
| 2019/0307291 A1 | 10/2019 | De' Longhi et al. | |
| 2019/0309955 A1 | 10/2019 | Castillo et al. | |
| 2019/0313846 A1 | 10/2019 | Abukashef | |
| 2019/0313847 A1 | 10/2019 | Chun et al. | |
| 2019/0328175 A1 | 10/2019 | Bancroft | |
| 2019/0380533 A1 | 12/2019 | Lien | |
| 2020/0033009 A1 | 1/2020 | Lee et al. | |
| 2020/0033010 A1 | 1/2020 | Kang et al. | |
| 2020/0072475 A1 | 3/2020 | Crow et al. | |
| 2020/0132309 A1 | 4/2020 | Oh et al. | |
| 2020/0138238 A1 | 5/2020 | Gromowski et al. | |
| 2020/0138239 A1 | 5/2020 | Gromowski et al. | |
| 2020/0149746 A1 | 5/2020 | Lee et al. | |
| 2020/0182484 A1 | 6/2020 | Cowan et al. | |
| 2020/0187708 A1 | 6/2020 | Samonigg et al. | |
| 2020/0187710 A1 | 6/2020 | Guo et al. | |
| 2020/0200393 A1 | 6/2020 | Goldberg et al. | |
| 2020/0200394 A1 | 6/2020 | Bruin-Slot et al. | |
| 2020/0200395 A1 | 6/2020 | Klok | |
| 2020/0208844 A1 | 7/2020 | Bruin-Slot et al. | |
| 2020/0229276 A1 | 7/2020 | Kim et al. | |
| 2020/0268200 A1 | 8/2020 | Anthony et al. | |
| 2020/0288725 A1 | 9/2020 | Ten Dam | |
| 2020/0309379 A1 | 10/2020 | Paller | |
| 2020/0323222 A1 | 10/2020 | Reese et al. | |
| 2020/0329908 A1 | 10/2020 | Chen | |
| 2020/0329909 A1 | 10/2020 | Conrad et al. | |
| 2020/0345173 A1 | 11/2020 | Reales Bertomeo | |
| 2020/0352385 A1 | 11/2020 | Home | |
| 2020/0378609 A1 | 12/2020 | Paller | |
| 2020/0383512 A1 | 12/2020 | Ito et al. | |

FOREIGN PATENT DOCUMENTS

| | | |
|---|---|---|
| CN | 205849310 U | 1/2017 |
| CN | 206080273 U | 4/2017 |
| CN | 206675433 U | 11/2017 |
| CN | 209032019 U | 6/2019 |
| WO | 2019092346 A1 | 5/2019 |
| WO | 2019092347 A1 | 5/2019 |
| WO | 2019129598 A1 | 7/2019 |
| WO | 2019153512 A1 | 8/2019 |
| WO | 2019157848 A1 | 8/2019 |
| WO | 2019207325 A1 | 10/2019 |
| WO | 2020016085 A1 | 1/2020 |
| WO | 2020033980 A1 | 2/2020 |
| WO | 2020043427 A1 | 3/2020 |
| WO | 2020077606 A1 | 4/2020 |
| WO | 2020098748 A1 | 5/2020 |
| WO | 2020108917 A1 | 6/2020 |
| WO | 2020113990 A1 | 6/2020 |
| WO | 2020118993 A1 | 6/2020 |
| WO | 2020125025 A1 | 6/2020 |
| WO | 2020148164 A1 | 7/2020 |
| WO | 2020148187 A1 | 7/2020 |
| WO | 2020168202 A1 | 8/2020 |
| WO | 2020174329 A1 | 9/2020 |
| WO | 2020233111 A1 | 11/2020 |
| WO | 2021005543 A1 | 1/2021 |

OTHER PUBLICATIONS

U.S. Appl. No. 17/219,238, filed Mar. 31, 2021, Cooking Device and Components Thereof.

International Search Report and Written Opinion received for PCT Patent International Application No. PCT/US2020/042120, dated Oct. 30, 2020, 14 pages.

* cited by examiner

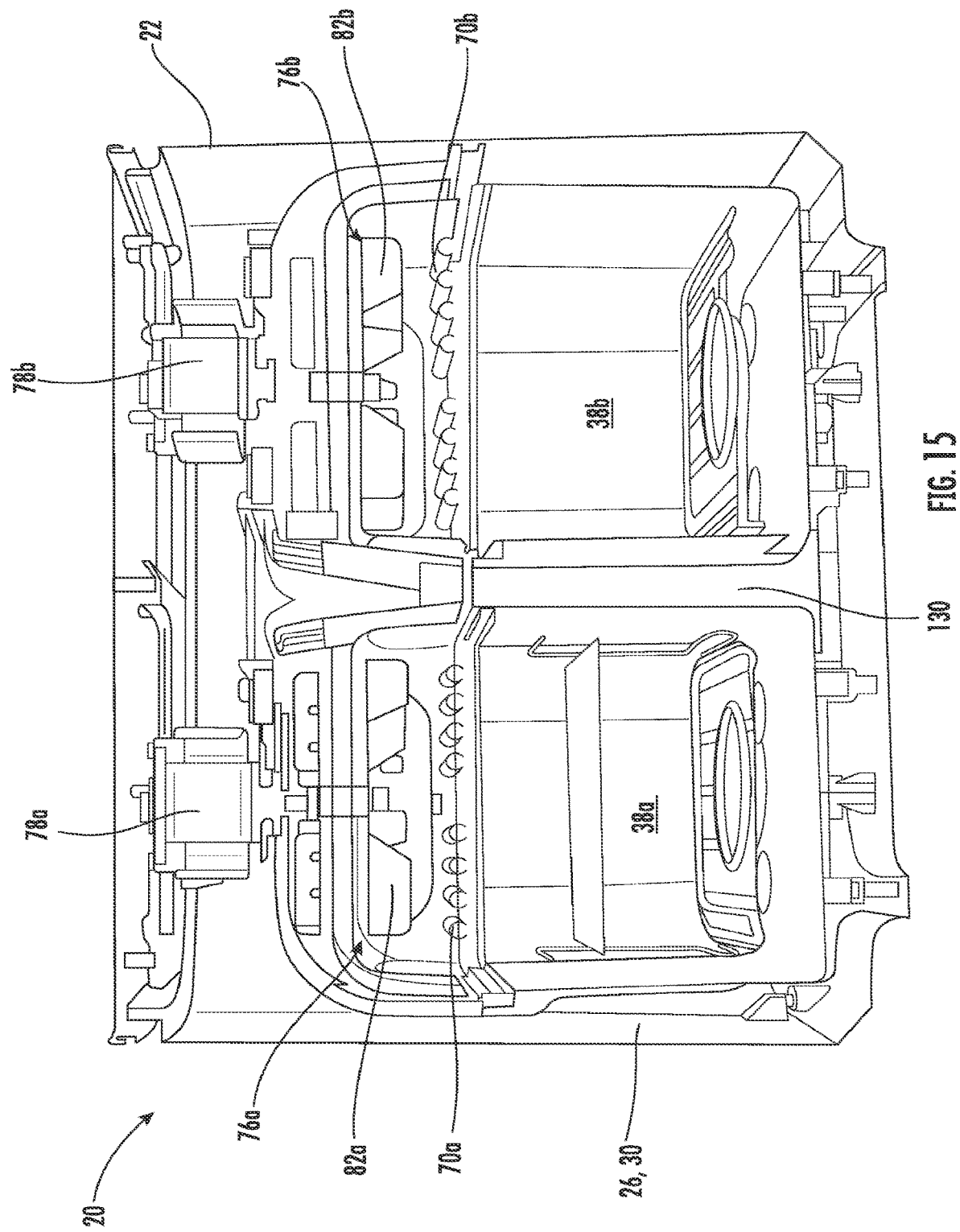

COOKING DEVICE AND COMPONENTS THEREOF

CROSS-REFERENCE TO RELATED APPLICATIONS

This application is a continuation of U.S. patent application Ser. No. 17/219,238, filed on Mar. 31, 2021, and entitled "Cooking Device and Components Thereof," which is a continuation of U.S. application Ser. No. 17/159,414, filed Jan. 27, 2021, and entitled "Cooking Device and Components Thereof," which is a 371 U.S. National Stage application of PCT/US2020/042120, filed Jul. 15, 2020, which claims the benefit of U.S. Provisional Application No. 62/874,193, filed Jul. 15, 2019, each of which is hereby incorporated by reference herein in their entireties.

BACKGROUND

Embodiments of the present disclosure relate generally to a cooking system, and more specifically, to a countertop cooking system operable in a plurality of distinct cooking modes.

SUMMARY

According to an embodiment, cooking system includes a housing having at least one internal compartment and a cooking container receivable within said at least one internal compartment. A cooking volume is defined within an interior of said cooking container. A bottom surface of said cooking container is angled upwardly. A heating element is associated with said at least one internal compartment.

In addition to one or more of the features described above, or as an alternative, in further embodiments said bottom surface of said cooking container is oriented at an angle to a surface for supporting the cooking system.

In addition to one or more of the features described above, or as an alternative, in further embodiments said bottom surface of said cooking container is not orthogonal to a back wall of said cooking container.

In addition to one or more of the features described above, or as an alternative, in further embodiments said cooking container includes a front wall and a back wall, and a height of said cooking container adjacent said back wall of said cooking container is greater than a height of said cooking container adjacent said front wall of said cooking container.

In addition to one or more of the features described above, or as an alternative, in further embodiments comprising an insert positionable within said interior of said cooking container, said insert including a food support surface having at least one opening formed therein.

In addition to one or more of the features described above, or as an alternative, in further embodiments said insert at least partially defines said cooking volume within said interior of said cooking container.

In addition to one or more of the features described above, or as an alternative, in further embodiments said food support surface has a generally horizontal orientation when said insert is arranged within said interior of said cooking container.

In addition to one or more of the features described above, or as an alternative, in further embodiments said food support surface is offset from said bottom surface of said cooking container by a clearance.

In addition to one or more of the features described above, or as an alternative, in further embodiments said clearance defined between said food support surface and said bottom surface of said cooking container varies over at least one dimension of the cooking container.

In addition to one or more of the features described above, or as an alternative, in further embodiments said insert further comprises at least one protrusion and said bottom surface of said cooking container further comprises at least one channel, said at least one protrusion being positioned within said at least one channel when said insert is properly installed in said interior of said cooking container.

In addition to one or more of the features described above, or as an alternative, in further embodiments an air duct separate from said cooking volume is defined between said insert and a portion of said cooking container.

In addition to one or more of the features described above, or as an alternative, in further embodiments said insert further comprises a blocking wall arranged at an angle to said food support surface and said air duct is defined between said blocking wall and a back wall of said cooking container.

In addition to one or more of the features described above, or as an alternative, in further embodiments comprising an air movement mechanism disposed in said housing.

In addition to one or more of the features described above, or as an alternative, in further embodiments comprising a motor operable to rotate said air movement mechanism about an axis of rotation, wherein said motor is located at least partially external to said at least one internal compartment.

In addition to one or more of the features described above, or as an alternative, in further embodiments said air movement mechanism further comprises a fan housing having a first inlet, a second inlet and an outlet, the first inlet and the second inlet being arranged in fluid communication with said outlet and a fan wheel rotatably mounted within said fan housing.

In addition to one or more of the features described above, or as an alternative, in further embodiments said fan wheel includes a first wheel portion having a first plurality of impeller blades and a second wheel portion having a second plurality of impeller blades.

According to an embodiment, a cooking system includes a housing having at least one internal compartment, a cooking container receivable within said at least one internal compartment, a cooking volume being defined within an interior of said cooking container, and a heating element associated with said at least one internal compartment. An air movement mechanism is disposed in said housing. The air movement mechanism is rotatable about an axis of rotation oriented relatively horizontally.

In addition to one or more of the features described above, or as an alternative, in further embodiments said axis of rotation is oriented substantially perpendicular to a flow provided at an outlet of said air movement mechanism towards a relative bottom of said housing.

In addition to one or more of the features described above, or as an alternative, in further embodiments said cooking container is movable relative to said housing along an axis of translation, and said axis of rotation is oriented perpendicularly to said axis of translation.

In addition to one or more of the features described above, or as an alternative, in further embodiments said air movement mechanism includes a first inlet, a second inlet, and an outlet, said first inlet and said second inlet being arranged in fluid communication with said outlet.

In addition to one or more of the features described above, or as an alternative, in further embodiments an air duct separate from said cooking volume is defined within said cooking container, and said outlet of said air movement mechanism is aligned with said air duct.

In addition to one or more of the features described above, or as an alternative, in further embodiments comprising a motor operable to rotate said air movement mechanism about said axis or rotation, wherein said motor is located at least partially external to said at least one internal compartment.

In addition to one or more of the features described above, or as an alternative, in further embodiments said air movement mechanism further comprises a fan housing and a fan wheel rotatably mounted within said fan housing.

In addition to one or more of the features described above, or as an alternative, in further embodiments said fan wheel includes a first wheel portion having a first plurality of impeller blades and a second wheel portion having a second plurality of impeller blades.

In addition to one or more of the features described above, or as an alternative, in further embodiments a configuration of said first plurality of impeller blades is substantially identical to a configuration of said second plurality of impeller blades.

In addition to one or more of the features described above, or as an alternative, in further embodiments a configuration of said first plurality of impeller blades is different than a configuration of said second plurality of impeller blades.

In addition to one or more of the features described above, or as an alternative, in further embodiments said air movement mechanism is disposed vertically above said cooking volume.

In addition to one or more of the features described above, or as an alternative, in further embodiments said air movement mechanism is disposed vertically above said cooking container.

In addition to one or more of the features described above, or as an alternative, in further embodiments an insert positionable within said interior of said cooking container, wherein a portion of said air movement mechanism is disposed in vertical alignment with said insert.

In addition to one or more of the features described above, or as an alternative, in further embodiments said air movement mechanism is horizontally offset from said heating element.

According to an embodiment, a cooking system includes a housing having at least one internal compartment, and a cooking container receivable within said at least one internal compartment. A cooking volume is defined within an interior of said cooking container. A heating element associated with said cooking volume. A rotatable air movement mechanism has a first inlet arranged in a first plane of said air movement mechanism and a second inlet arranged in a second plane of said air movement mechanism, said second plane being distinct from said first plane. An outlet of the air movement mechanism is arranged in fluid communication with both said first inlet and said second inlet.

In addition to one or more of the features described above, or as an alternative, in further embodiments said air movement mechanism is rotatable about an axis of rotation and during operation of said air movement mechanism, said first inlet and said second inlet being fixed relative to said axis of rotation.

In addition to one or more of the features described above, or as an alternative, in further embodiments said cooking container is movable relative to said housing along an axis of translation, and said axis of rotation is oriented perpendicularly to said axis of translation.

In addition to one or more of the features described above, or as an alternative, in further embodiments said first plane and said second plane are substantially parallel.

In addition to one or more of the features described above, or as an alternative, in further embodiments said first plane is defined at a first side of said air movement mechanism and said second plane is defined at a second side of said air movement mechanism.

In addition to one or more of the features described above, or as an alternative, in further embodiments said second side is opposite said first side.

In addition to one or more of the features described above, or as an alternative, in further embodiments an air duct separate from said cooking volume is defined within said cooking container, and said outlet of said air movement mechanism is aligned with said air duct.

In addition to one or more of the features described above, or as an alternative, in further embodiments comprising a motor operable to rotate said air movement mechanism about an axis or rotation, wherein said motor is located at least partially external to said at least one internal compartment.

In addition to one or more of the features described above, or as an alternative, in further embodiments said air movement mechanism further comprises a fan housing and a fan wheel rotatably mounted within said fan housing.

In addition to one or more of the features described above, or as an alternative, in further embodiments said fan wheel includes a first wheel portion having a first plurality of impeller blades and a second wheel portion having a second plurality of impeller blades.

In addition to one or more of the features described above, or as an alternative, in further embodiments said air movement mechanism is positioned vertically above at least one of said cooking volume and said cooking container.

In addition to one or more of the features described above, or as an alternative, in further embodiments comprising an insert positionable within said interior of said cooking container, wherein a portion of said air movement mechanism is disposed in vertical alignment with said insert.

In addition to one or more of the features described above, or as an alternative, in further embodiments said air movement mechanism is horizontally offset from said heating element.

According to yet another embodiment, a cooking system includes a housing having at least one internal compartment and a cooking container receivable within said at least one internal compartment. A cooking volume is defined within an interior of said cooking container. A heating element is associated with said cooking volume. A plurality of air movement mechanism is disposed within said housing and a motor is operably coupled to said plurality of air movement mechanisms.

In addition to one or more of the features described above, or as an alternative, in further embodiments said motor is located externally to said at least one internal compartment.

In addition to one or more of the features described above, or as an alternative, in further embodiments said plurality of air movement mechanisms includes a first air movement mechanism and a second air movement mechanism.

In addition to one or more of the features described above, or as an alternative, in further embodiments said motor includes a first output shaft and a second output shaft, said first air movement mechanism being operably coupled to said first output shaft and said second air movement mechanism being operably coupled to said second output shaft.

In addition to one or more of the features described above, or as an alternative, in further embodiments said first air movement mechanism and a second air movement mechanism are arranged coaxially.

In addition to one or more of the features described above, or as an alternative, in further embodiments said motor operates said first air movement mechanism at a first speed and said motor operates said second air movement mechanism at a second speed, said first speed and said second speed being substantially identical.

In addition to one or more of the features described above, or as an alternative, in further embodiments said motor operates said first air movement mechanism at a first speed and said motor operates said second air movement mechanism at a second speed, said first speed being different than said second speed.

In addition to one or more of the features described above, or as an alternative, in further embodiments said at least one internal compartment includes a first internal compartment and a second internal compartment, said first internal compartment being fluidly separate from said second internal compartment.

In addition to one or more of the features described above, or as an alternative, in further embodiments said first air movement mechanism is positioned within said first internal compartment and said second air movement mechanism is positioned within said second internal compartment.

In addition to one or more of the features described above, or as an alternative, in further embodiments said motor is positioned between said first internal compartment and said second internal compartment.

According to yet another embodiment, a cooking system includes a housing having at first internal compartment and a second internal compartment. At least one cooking container is receivable within one of said first internal compartment and said second internal compartment. At least one cooking volume is defined within an interior of said at least one cooking container. At least one heating element disposed in said housing.

In addition to one or more of the features described above, or as an alternative, in further embodiments said at least one cooking container is a first cooking container receivable within said first internal compartment and a second cooking container receivable within said second internal compartment, wherein a first cooking volume is defined within an interior of said first cooking container and a second cooking volume is defined within an interior of said second cooking container.

In addition to one or more of the features described above, or as an alternative, in further embodiments said at least one heating element includes a first heating element positioned within said first internal compartment and a second heating element positioned within said second internal compartment.

In addition to one or more of the features described above, or as an alternative, in further embodiments comprising at least one air movement mechanism disposed within said housing.

In addition to one or more of the features described above, or as an alternative, in further embodiments said at least one air movement mechanism is stacked vertically relative to said at least one heating element within said housing.

In addition to one or more of the features described above, or as an alternative, in further embodiments said at least one air movement mechanism includes a first inlet, a second inlet, and an outlet, said first inlet and said second inlet being arranged in fluid communication with said outlet.

In addition to one or more of the features described above, or as an alternative, in further embodiments said at least one air movement mechanism further comprises: a fan housing and a fan wheel rotatably mounted within said fan housing.

In addition to one or more of the features described above, or as an alternative, in further embodiments said fan wheel includes a first wheel portion having a first plurality of impeller blades and a second wheel portion having a second plurality of impeller blades.

In addition to one or more of the features described above, or as an alternative, in further embodiments said at least one air movement mechanism includes a first air movement mechanism associated with said first internal compartment and a second air movement mechanism associated with said second internal compartment.

In addition to one or more of the features described above, or as an alternative, in further embodiments said at least one air movement mechanism has an axially oriented inlet and a radially oriented outlet.

In addition to one or more of the features described above, or as an alternative, in further embodiments said at least one air movement mechanism is rotatable about a vertically oriented axis.

In addition to one or more of the features described above, or as an alternative, in further embodiments comprising a motor operably coupled to said at least one air movement mechanism.

In addition to one or more of the features described above, or as an alternative, in further embodiments said motor is located externally from said first internal compartment and said second internal compartment.

In addition to one or more of the features described above, or as an alternative, in further embodiments said motor is positioned between said first internal compartment and said second internal compartment.

In addition to one or more of the features described above, or as an alternative, in further embodiments said first cooking container and said second cooking container are individually insertable into said first cooking compartment and said second cooking compartment respectively.

In addition to one or more of the features described above, or as an alternative, in further embodiments said first internal compartment and said second internal compartment are fluidly separate.

In addition to one or more of the features described above, or as an alternative, in further embodiments said first cooking volume and said second cooking volume are fluidly separate.

According to another embodiment, a cooking system includes a housing having at least one internal compartment and a cooking container receivable within said at least one internal compartment. A cooking volume is defined within an interior of said cooking container. A heating element is associated with said at least one internal compartment and an air movement mechanism is disposed in said housing. The air movement mechanism is positioned vertically above said cooking volume and horizontally offset from said heating element.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 15 is a perspective cross-sectional view of the cooking system of FIG. 13 according to an embodiment.

DETAILED DESCRIPTION

Figure 1:
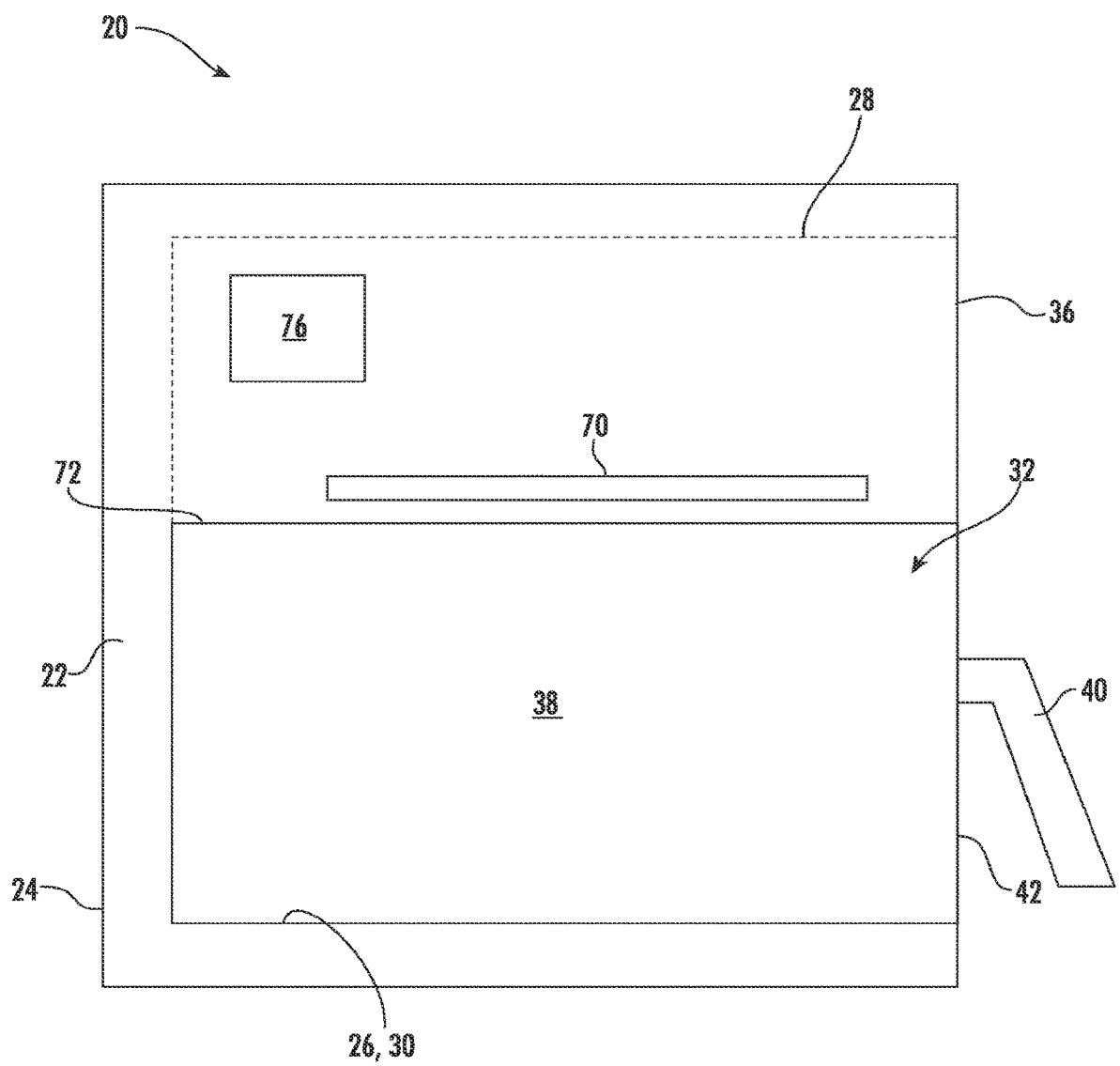
FIG. 1 is a schematic diagram of a cooking system having a cooking container installed therein according to an embodiment.
Figure 2:
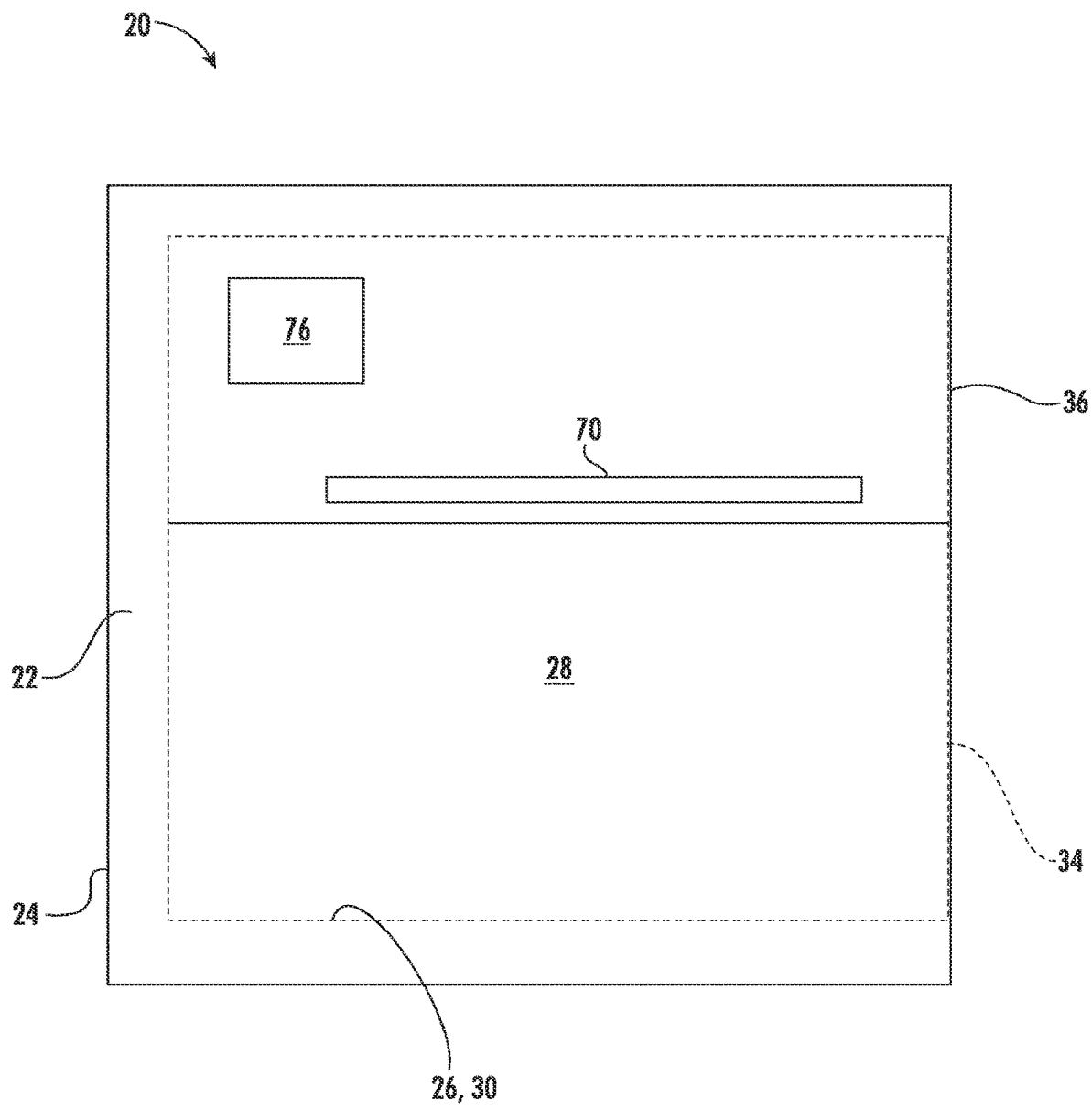
FIG. 2 is a schematic diagram of the cooking system of FIG. 1 absent the cooking container according to an embodiment.

With reference now to the FIGS., an example of a cooking system 20 is illustrated at numeral 20. As best shown in FIGS. 1 and 2, the cooking system 20 includes a housing 22 having an exterior heat resistant or non-conductive surface 24 and an interior surface 26 that defines an at least partially hollow compartment 28 arranged within an interior of the housing 22. The housing 22 may be formed as a single unitary body, or alternatively, may be formed by connecting a plurality of pieces together. In addition, the housing 22 may be made of any suitable material, including but not limited to glass, aluminum, plastic, or stainless steel for example. A liner 30 may be disposed within at least a portion of the housing 22. The liner 30 may be formed from any suitable conductive material, such as aluminum for example. In an embodiment, the liner 30 forms at least a portion of the interior surface 26 and thereby defines at least a portion of the internal compartment 28 of the housing 22. However, it should be understood that other components of the cooking system 20, or surfaces thereof, may also define the internal compartment 28.

A cooking container 32 is receivable within a portion of the internal compartment 28 of the housing 22, such as a bottom portion of the internal compartment 28 for example. Although the cooking container 32 is described herein as being separable from the housing 22, embodiments where the cooking container 32 is movably connected with or integrally formed with the housing 22 are also contemplated herein. The cooking container 32 may be a pot formed from a ceramic, metal, or die cast aluminum material. However, any suitable material capable of withstanding the high temperatures required for cooking food products are also within the scope of the disclosure. In an embodiment, the cooking container 32 is configured to translate along an axis relative to the housing 22 such that the cooking container 32 is slidably received within an opening 34 formed in a wall 36 of the housing 22. Accordingly, in such embodiments, a size and shape of the cooking container 32 may be complementary to the size and shape of the opening 34. In the illustrated, non-limiting embodiment, the cooking container 32 is generally square in shape. However, in other embodiments, the cooking container 32 may have another configuration.

The cooking container 32 has a generally hollow interior 38 for supporting one or more consumable products, such as food products for example, therein. Examples of food products suitable for use with the cooking system 20, include but are not limited to, meats, fish, poultry, bread, rice, grains, pasta, vegetables, fruits, and dairy products, among others.

At least one handle 40 may be associated with the cooking container 32 to allow a user to easily grasp and manipulate the cooking container 32 relative to the housing 22. In the illustrated, non-limiting embodiment, the cooking container 32 includes a single handle 40 extending from a first, front surface 42 of the cooking container 32. Although the cooking container 32 illustrated and described herein has a single handle 40, in other embodiments, the cooking container 32 may have two or more handles, or alternatively, a handle or groove formed into a surface of the cooking container 32. Any suitable configuration of the cooking container 32 and/or handle(s) 40 is within the scope of the disclosure.

Figure 4:
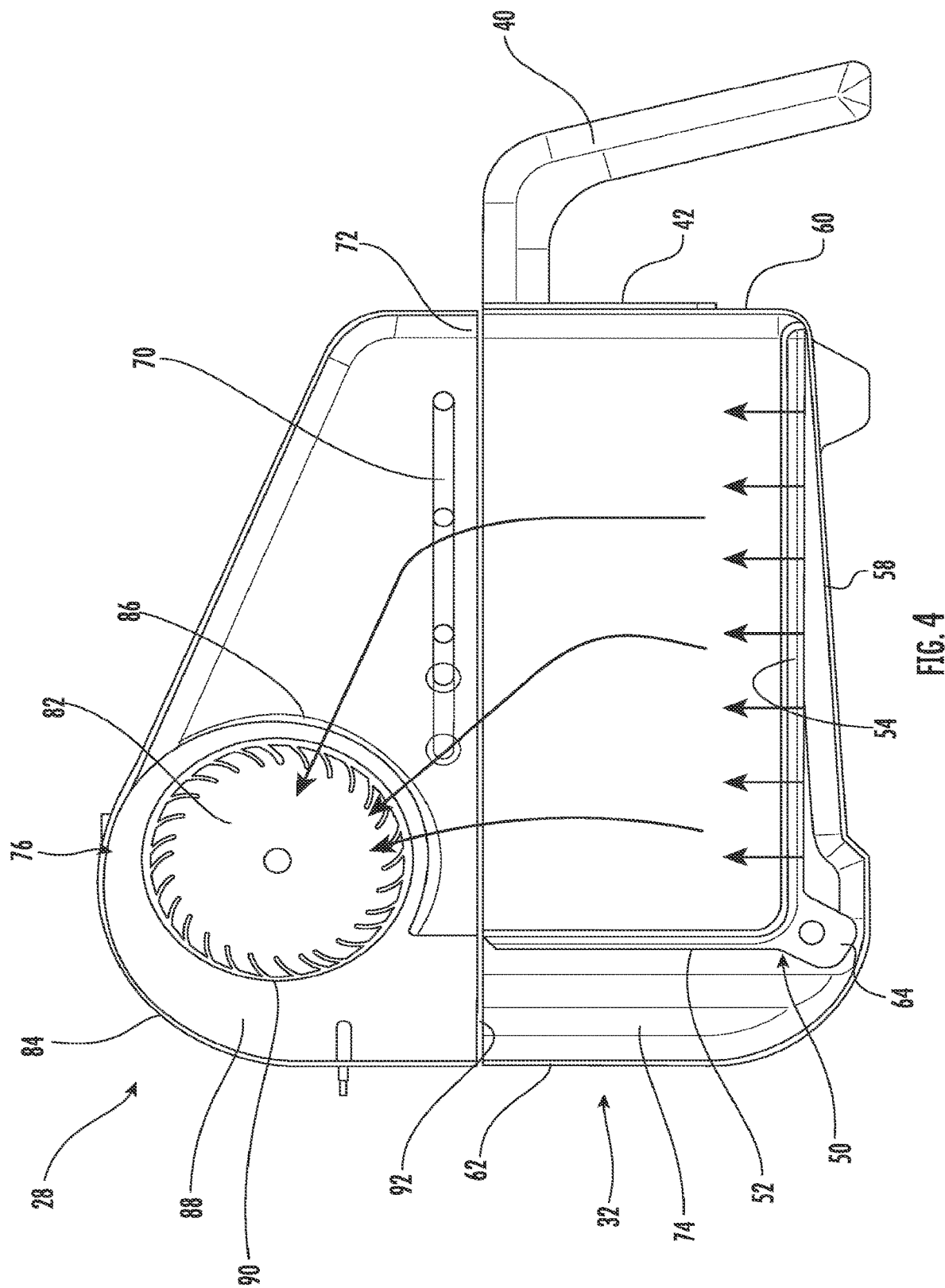
FIG. 4 is a cross-sectional view of a portion of a cooking system according to an embodiment.
Figure 5:
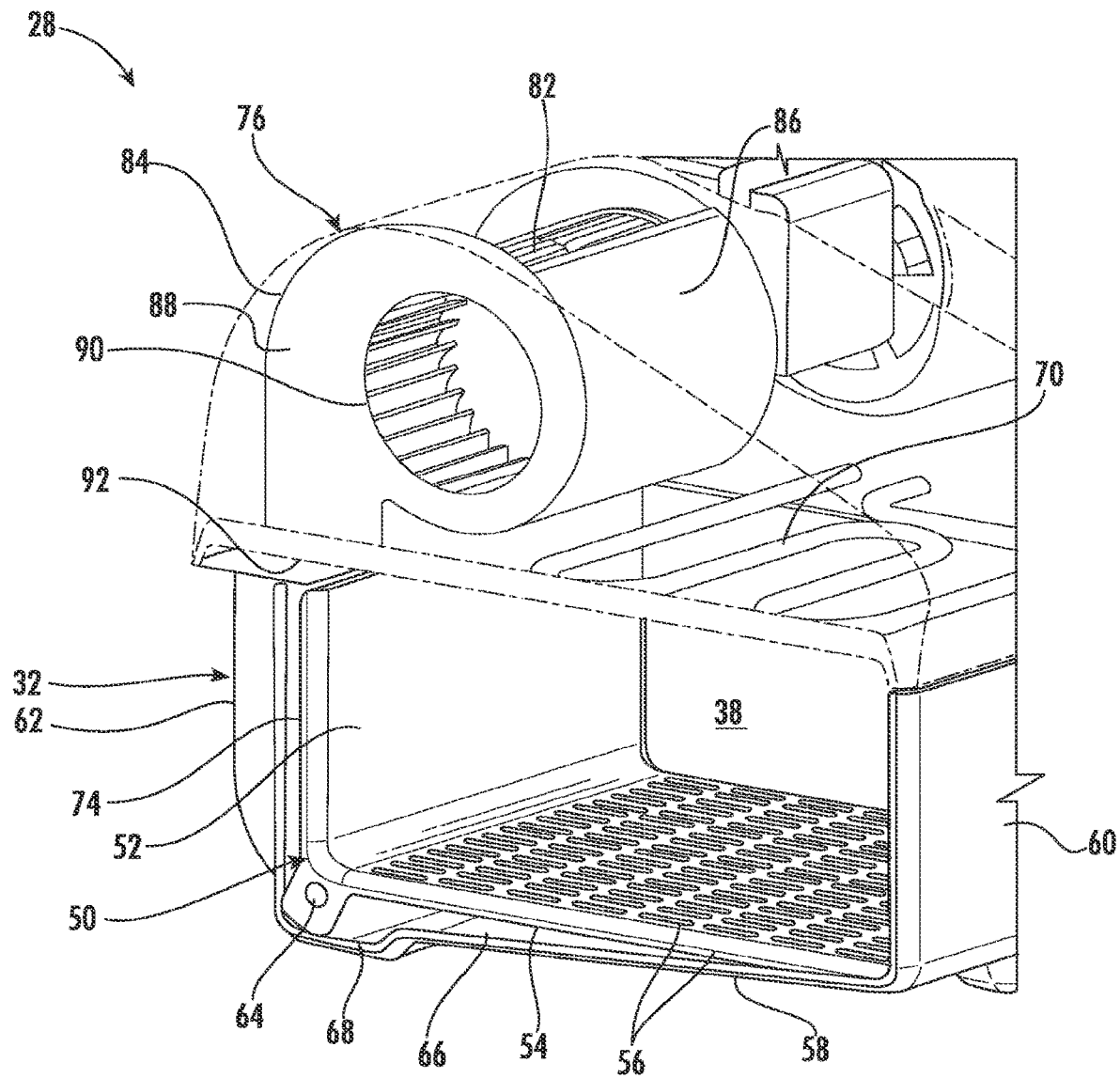
FIG. 5 is a perspective view of a portion of a cooking system according to an embodiment.

One or more inserts or food support structures 50 may be positionable within the interior 38 of the cooking container 32. In such embodiments, the insert 50 provides a surface on which food is supported. An example of an insert 50 suitable for use with the cooking container 32 is best shown in FIGS. 4 and 5. As shown, the insert 50 includes a solid blocking wall 52 and a food support surface 54 having a plurality of perforations or openings 56 formed therein. In the illustrated, non-limiting embodiment, the blocking wall 52 and the food support surface 54 are arranged generally perpendicular to one another. Although the insert 50 is shown as being an L-shaped plate, in other embodiments, the insert 50 may include additional side walls such that the insert 50 is a basket for example. When the insert 50 is installed within the interior 38 of the cooking container 32, the blocking wall 52 and the food support surface 54 of the insert 50 cooperate with one or more walls of the cooking container 32 to define an area there between referred to herein as a "cooking volume." Further, in embodiments where an insert is not disposed within the cooking container 32, the interior 38 of the cooking container 32 may define the cooking volume.

In the illustrated, non-limiting embodiment, the bottom surface 58 of the cooking container 32 is sloped relative to a bottom surface of the housing 22 or to a surface on which the cooking system 20 may be positioned and supported. As shown, the slope extends generally upwardly towards a front wall 60 of the cooking container 32. As a result, a height of the interior 38 of the cooking container 32 adjacent a back wall 62 is greater than a height of the interior 38 of the cooking container 32 adjacent the front wall 60 thereof. When the insert 50 is installed within the interior 38 of the cooking container 32, the food support surface 54 has a generally horizontal orientation. As shown, the insert 50 may include one or more protrusions 64, such as tabs for example, configured to contact the bottom surface 58 of the cooking container 32 to achieve this desired orientation. The food support surface 54 is therefore at least partially offset from the bottom surface 58 of the cooking container 32. Because of the angled configuration of the bottom surface 58 of the cooking container 32, the clearance 66 between the bottom surface 58 and the food support surface 54, varies, and more specifically, gradually decreases from a back to a front of the cooking container 32.

The insert 50 and the bottom surface 58 of the cooking container 32 may cooperate to properly position the insert within the interior 38 such that the blocking wall 52 of the insert 50 is offset from the back wall 62 of the cooking container 32. This clearance between the blocking wall 52 and the back wall 62 defines an air duct 74 within the cooking container 32, separate from the cooking volume, and through which air is circulated during operation of the cooking system 20. In an embodiment, a contour of the cooking container 32 facilitates positioning of the insert 50 relative to the cooking container 32. As previously described, one or more protrusions 64 extend from a bottom surface of the insert 50, and as best shown in FIGS. 4 and 5, the bottom surface 58 of the cooking container 32 may be contoured to define one or more channels 68 therein. When the insert 50 is positioned within the cooking container 32, the one or more protrusions 64 are received within the one or more channels 68. The engagement between the at least one protrusion 64 and the sidewalls of the channel(s) 68 properly positions the insert 50 within the cooking container 32 to create a suitably sized air duct 74.

Figure 3:
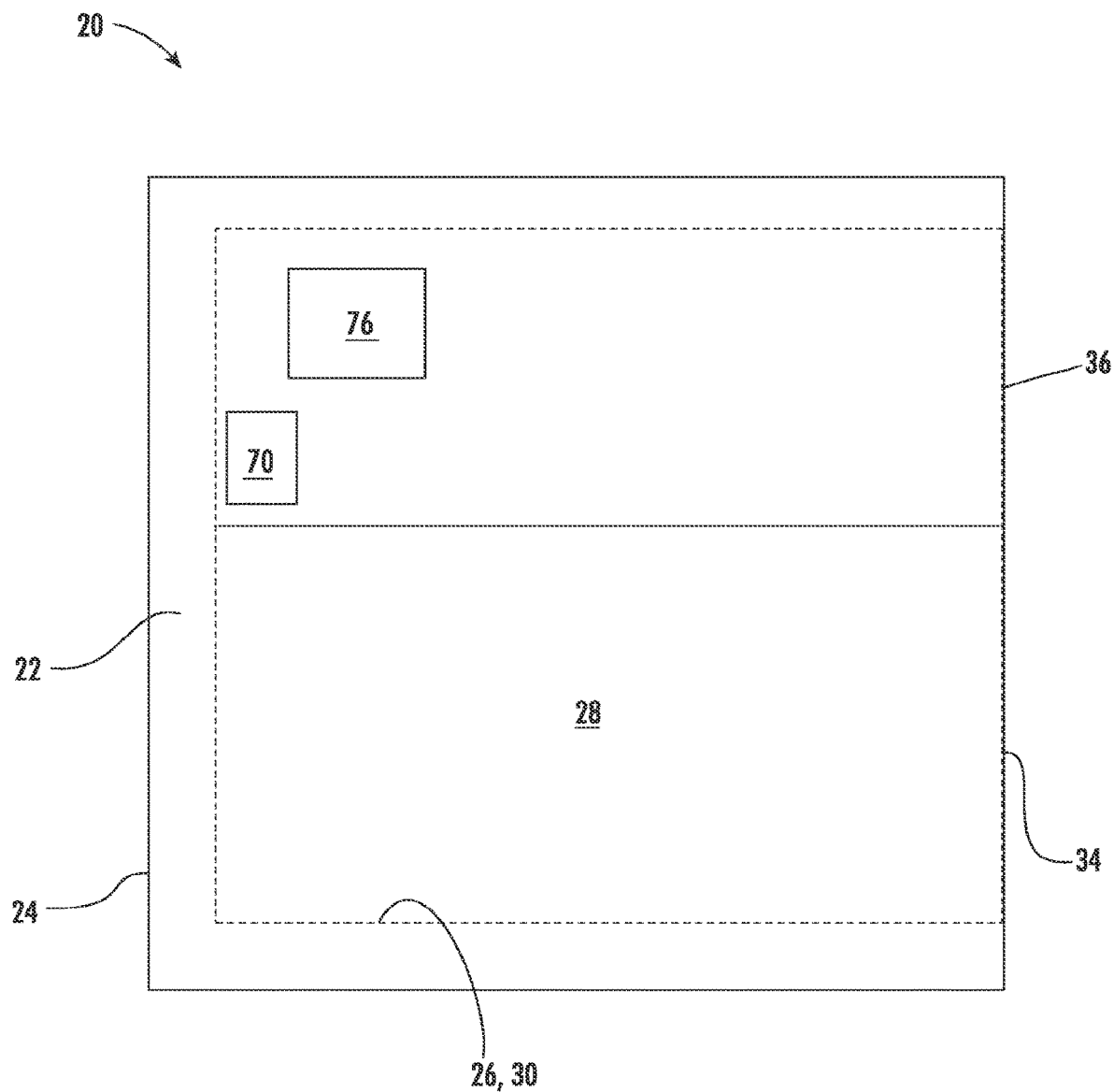
FIG. 3 is a schematic diagram of another cooking system absent the cooking container according to an embodiment.

The cooking system 20 additionally includes at least one heating element 70 operable to impart heat to the cooking volume during one or more modes of operation of the cooking system 20. In the illustrated, non-limiting embodiment best shown in FIGS. 1, 2 and 4-5, the at least one heating element 70 is positioned within the internal compartment 28, generally at or above an upper extent or surface 72 of the cooking container 32, such as proximate a center of the cooking container 32 for example. In an embodiment, the heating element 70 is disposed adjacent a center of the cooking volume and/or the cooking container 32. In such embodiments, the at least one heating element 70 is mounted completely outside of the cooking container 32, and vertically offset from the upper extent or surface 72 thereof. In another embodiment, best shown in FIG. 3, the at least one heating element 70 may be located adjacent the rear of the internal compartment 28, such as in vertical alignment with the air duct 74 formed between the blocking wall 52 of the insert 50 and the back wall 62 of the cooking container 32. However, it should be understood that a heating element 70 located at any suitable location is within the scope of the disclosure.

The at least one heating element 70 may be capable of performing any suitable type of heat generation. For example, a heating element 70 configured to heat one or more food items located within the cooking volume of the cooking container 32 via conduction, convection, radiation, and induction are all within the scope of the disclosure. In the illustrated, non-limiting embodiment, the heating element 70 is a convective heating element, and the cooking system 20 additionally includes an air movement mechanism 76, such as a fan for example, operable to circulate air through the cooking volume. The air is heated as it flows along a path of circulation, such as by flowing over a portion of the at least one heating element 70. As shown, the air movement mechanism 76 is located within the internal compartment 28 at a position entirely above the upper extent 72 of the cooking container 32. In addition, at least a portion of the air movement mechanism 76, and in some embodiment, the entirety of the air movement mechanism 76, is disposed vertically above the cooking volume, and therefore the insert 50. As shown, the air movement mechanism 76 is horizontally offset from the at least one heating element 70. However, embodiments where the air movement mechanism 76 vertically or horizontally overlaps or is aligned with the at least one heating element 70 are also contemplated herein.

The air movement mechanism 76, or at least a portion thereof may be removable from the internal compartment. In the illustrated, non-limiting embodiment, the air movement mechanism 76 is driven by a motor 78 located at least partially externally to the internal compartment 28. Further, the cooking system 20 may include a vent 80 for exhausting hot air generated by operation of at least one of the air movement mechanism 76 or the motor 78 to the exterior of the cooking system 20. Although the vent 80 is illustrated as being formed at the rear of the internal compartment 28, embodiments where the vent 80 is formed at another location are also contemplated herein.

Figure 6:
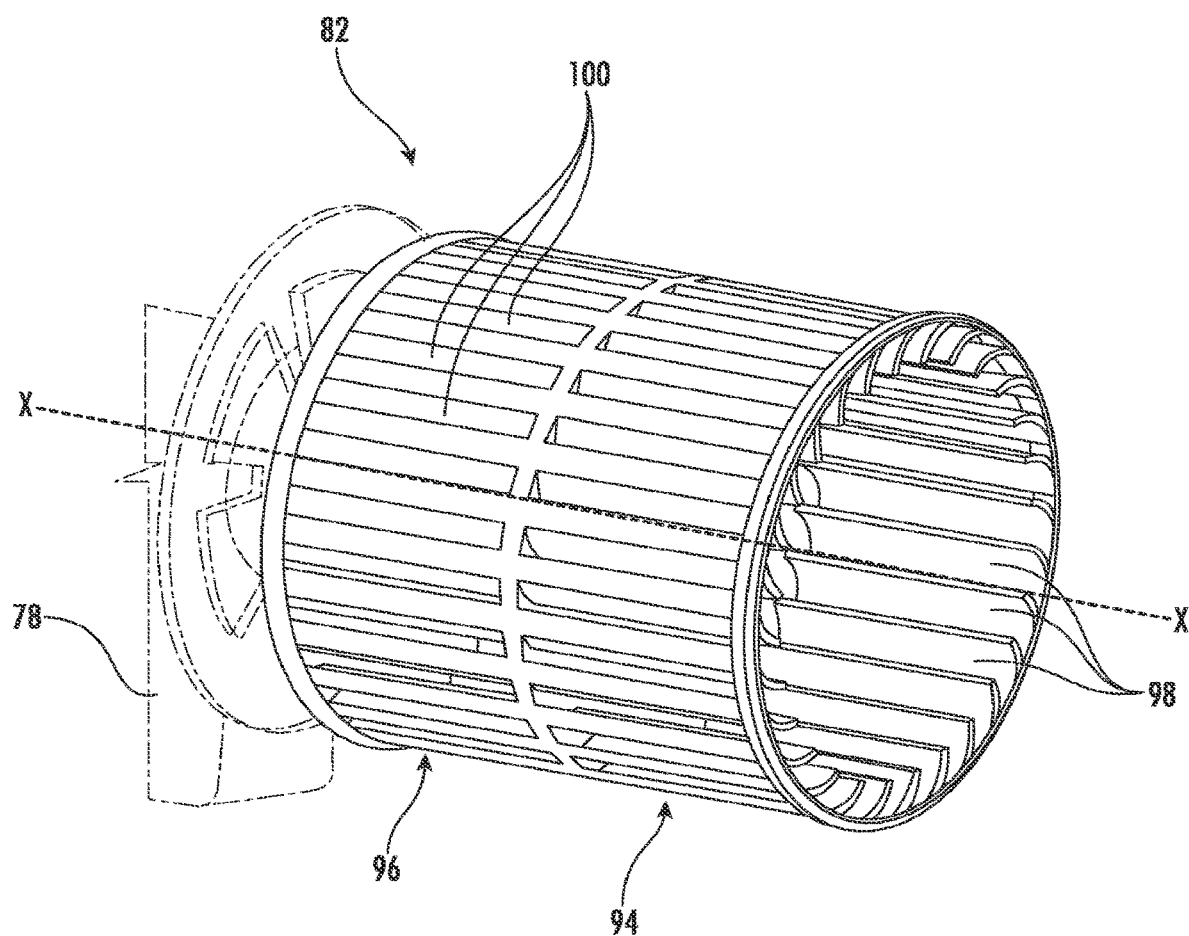
FIG. 6 is a perspective view of a fan wheel of an air movement mechanism of the cooking system according to an embodiment.

An example of the air movement mechanism 76 is illustrated in more detail in FIGS. 5 and 6. In the illustrated, non-limiting embodiment, the air movement mechanism 76 includes a fan wheel 82 positioned within a fan housing 84. As shown, the fan wheel 82 is configured to rotate about an axis X oriented generally horizontally, and in some embodiments, the axis of the fan wheel is oriented perpendicular to the translational axis along which the cooking container 32 is configured to move relative to the housing 22. The fan housing 84 has an outer wall 86 having a scroll-shaped length, a first sidewall 88 including a first inlet aperture 90 and a second sidewall (not shown) including a second inlet aperture. Although the outlet opening 92 of the fan housing 84 is illustrated as being generally rectangular in shape, embodiments where the outlet opening 92 is another shape are also contemplated herein.

With specific reference now to FIG. 6, the fan wheel 82 is typically formed with first wheel portion 94 and a second wheel portion 96. Both the first wheel portion 94 and the second wheel portion 96 function as an air inlet and are configured to provide air to a single plenum. The air inlet defined by the first wheel portion 94 is arranged in a first plane at a first side of the air movement mechanism 76 and the air inlet defined by the second wheel portion 96 is arranged in a second plane at a second side of the air movement mechanism 76, the first and second planes being generally parallel. Accordingly, the air inlets defined by the first and second wheel portions 94, 96 remain generally fixed relative to both the fan housing 84 and an axis of rotation of the fan wheel 82. The first wheel portion 94 includes a first plurality of impeller blades 98 and the second wheel portion 96 similarly includes a second plurality of impeller blades 100. One or both of the first plurality and the second plurality of impeller blades 98, 100 may have a backward curved configuration, a forward curved configuration, or another configuration.

Figure 7:
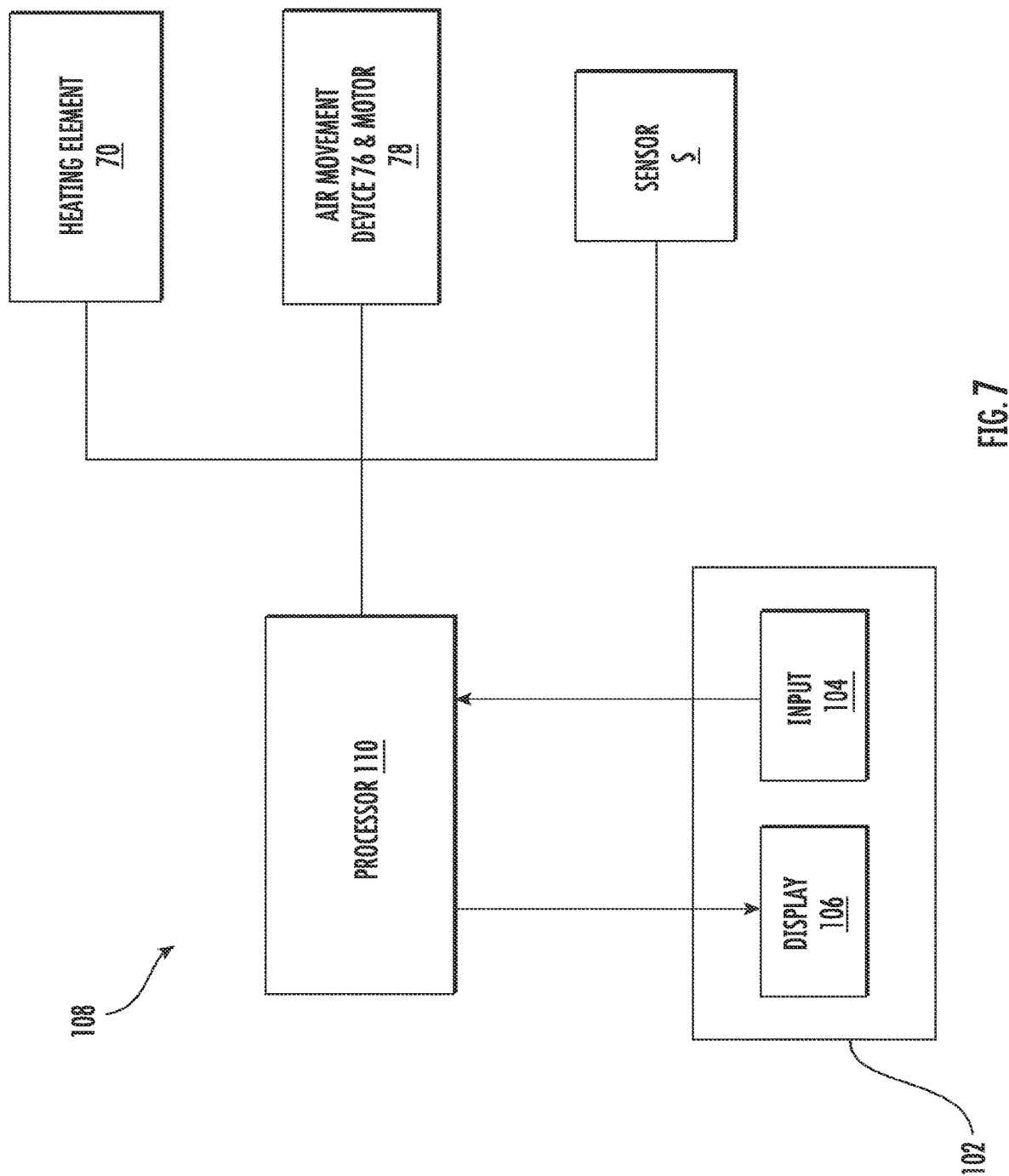
FIG. 7 is a schematic diagram of a control system of the cooking system according to an embodiment.

With reference now to FIG. 7, a control panel or user interface 102 may be positioned at an exterior surface of the housing 22. The control panel 102 includes one or more inputs 104 associated with energizing the heating element 70 of the cooking system 20 and for selecting various modes of operation of the cooking system 20. One or more of the inputs 104 may include a light or other indicator to show that the respective input has been selected. The control panel 102 may additionally include a display 106 separate from and associated with the at least one input 104. However, embodiments where the display 106 is integrated into the at least one input 104 are also contemplated herein.

Operation of the one or more inputs 104 will be described in more detail below. FIG. 7 illustrates an example of a control system 108 of the cooking system 20 including a controller or processor 110 for controlling operation of the heating element 70 and air movement device 76 (including the motor 78 associated therewith), and in some embodiments for executing stored sequences of heating operation. The processor 110 is operably coupled to the control panel 102 and to the heating element 70 and the air movement mechanism 76.

In addition, the cooking system 20 may include one or more sensors S for monitoring one or more parameters associated with the temperature of the heating element 70, the cooking volume, the airflow being delivered to the cooking volume and/or and the insert 50 positioned within the cooking container 32 during a cooking operation. Accordingly, operation of the cooking system 20, and in particular of the one or more heating elements 70, may be regulated in response to the parameters sensed by the one or more sensors S. In an embodiment, the one or more sensors S includes a temperature sensor arranged in communication with the processor 110. In an embodiment, the temperature sensor(s) S, such as a negative temperature coefficient (NTC) sensor for example, is positioned adjacent the rear of the internal compartment 28, upstream from the air duct 74 defined between the back wall 62 of the cooking container 32 and the blocking wall 52 of the insert 50. In embodiments of the cooking system 20 including one or more temperature sensors S, adjustment of an operating parameter, such as operation of the heating element 70 for example, may be performed using the control algorithm in response to the temperature of the heated airflow, measured by the temperature sensor S disposed in the heated airflow. For example, power provided to the heating element 70 may be increased if the sensed airflow temperature is below a set point, and the power provided to the heating element 70 may be reduced or ceased completely if the sensed airflow temperature is above a set point, thereby allowing the cooking volume to cool.

In an embodiment, the air movement mechanism 76 of the cooking system 20 is a variable speed fan operable at a plurality of rotational speeds. In an embodiment, the operational speed of the air movement mechanism 76 may vary based on the cooking mode selected. For example, the speed of the air movement mechanism 76 during operation in a first cooking mode may be different than the speed of the air movement mechanism 76 during operation in a second cooking mode. The operational speed of the air movement mechanism 76 may be controlled by the processor 110 in response to one or more inputs 104, including selection of a cooking mode. However, the processor 110 may also be configured to adjust the operational speed of the air movement mechanism 76, or alternatively, the power supplied to the at least one heating elements 70 to control the temperature and/or pressure within the interior 38 of the cooking container 32.

In an embodiment, at least one input 104 on the control panel 102 is an on/off button which allows the user to activate or deactivate the control panel 102. When the control panel 102 is deactivated, the one or more heating elements 70 are not energized. In an exemplary embodiment, the at least one input 104 is operable to select one or more manual modes of operation of the heating element 70. Alternatively, or in addition, at least one input 104 is operable to select a stored sequence of operation of the heating element 70. In some cases, the stored sequences may be particularly well suited for a given method of food preparation and/or for particular ingredients or types of ingredients. The plurality of stored sequences associated with the at least one input 104 may be stored within a memory accessible by the processor 110. Alternatively, the plurality of stored sequences may be stored remotely from the cooking system 20, and may be accessed by the processor 110, such as via wireless communication for example.

In addition, a user may be able to enter a time associated with operation of the cooking system 20 in a desired manual mode. The time may be entered via the same input 104 or a separate input 104 as used to select a mode of operation. Further in embodiments where the cooking system 20 is in a mode configured to perform a stored sequence in response to selection of one of the inputs 104, the display 106 may indicate a time remaining. Temperature or other parameters may also be entered via inputs 104 and/or shown on the display 106.

The at least one input 104 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input 104 has been selected and any necessary information has been provided to the control panel 102. Alternatively, one or more of the other inputs 104 may be operable to start and stop operation of the cooking system 20, regardless of whether the cooking system 20 is following a stored sequence or is in a manual mode.

As previously noted, the one or more inputs 104 may be operable to initiate operation of the cooking system 20 in a plurality of cooking modes. In an embodiment, the cooking system 20 is operable in a cooking mode where the heating element 70 is employed to perform a non-contact heating operation, such as a convective or radiative heating operation. Suitable cooking operations that may be performed in this first cooking mode include, but are not limited to air frying, broiling, baking/roasting, and dehydrating.

During operation in the first cooking mode, the air movement mechanism 76 is operable to circulate a heated air flow through the cooking volume. As previously described, the air movement mechanism 76 is operable to draw air upwards, through the adjacent heating element 70 and into the two inlets arranged at opposing sides of the fan wheel 82. The heated air is expelled outwardly from the outlet opening 92 of the fan housing 84 in a single direction. In the illustrated, non-limiting embodiment, the air output from the air movement mechanism 76 is provided within a plane directed downwardly into the cooking container 32. In the illustrated, non-limiting embodiment, the outlet opening 92 arranged directly adjacent the upper extent 72 of the cooking container 32, such that the air is expelled from the outlet opening 92 directly into the air duct 74 formed within the cooking container 32. Once the heated air reaches the bottom surface 58 of the cooking container 32, the hot air will be deflected off the bottom surface 58 towards the cooking volume. Because the bottom surface 58 of the cooking container 32 is sloped, the interaction between the heated air and the sloped bottom surface 58 directs the heated air both forwards and upwardly, causing the air to evenly distribute from the back to the front of the cooking container 32 before passing through the openings 56 formed in the food support surface 54 of the insert 50. The hot air is drawn by the air movement mechanism 76 through the openings 56 and over the exterior of the food items positioned on the food support surface 54. From within the cooking volume, the air is then drawn back into one of the inlets of the air movement mechanism 76 for further circulation within the interior 28.

Figure 8:
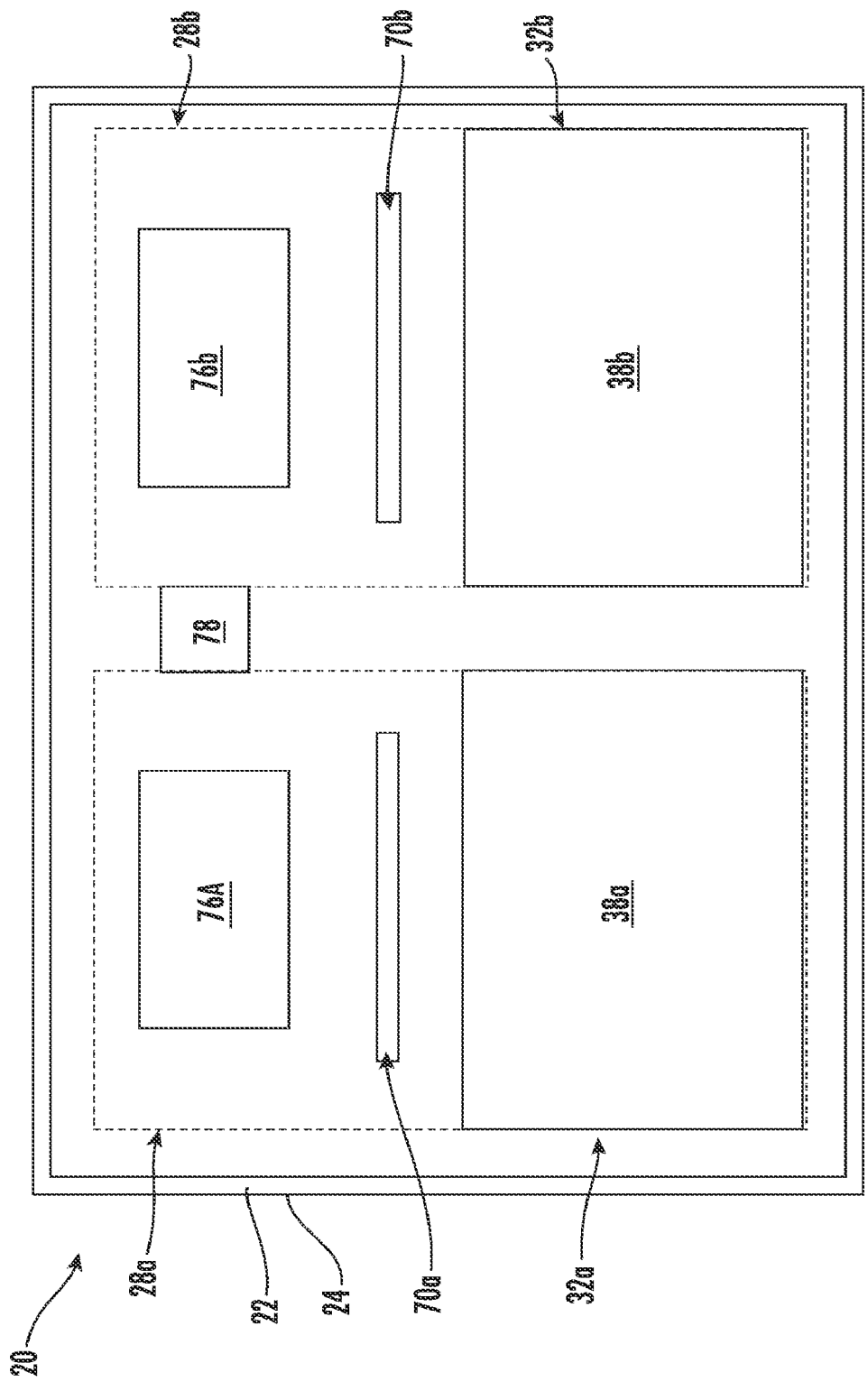
FIG. 8 is a front perspective view of a portion of the cooking system according to another embodiment.
Figure 9:
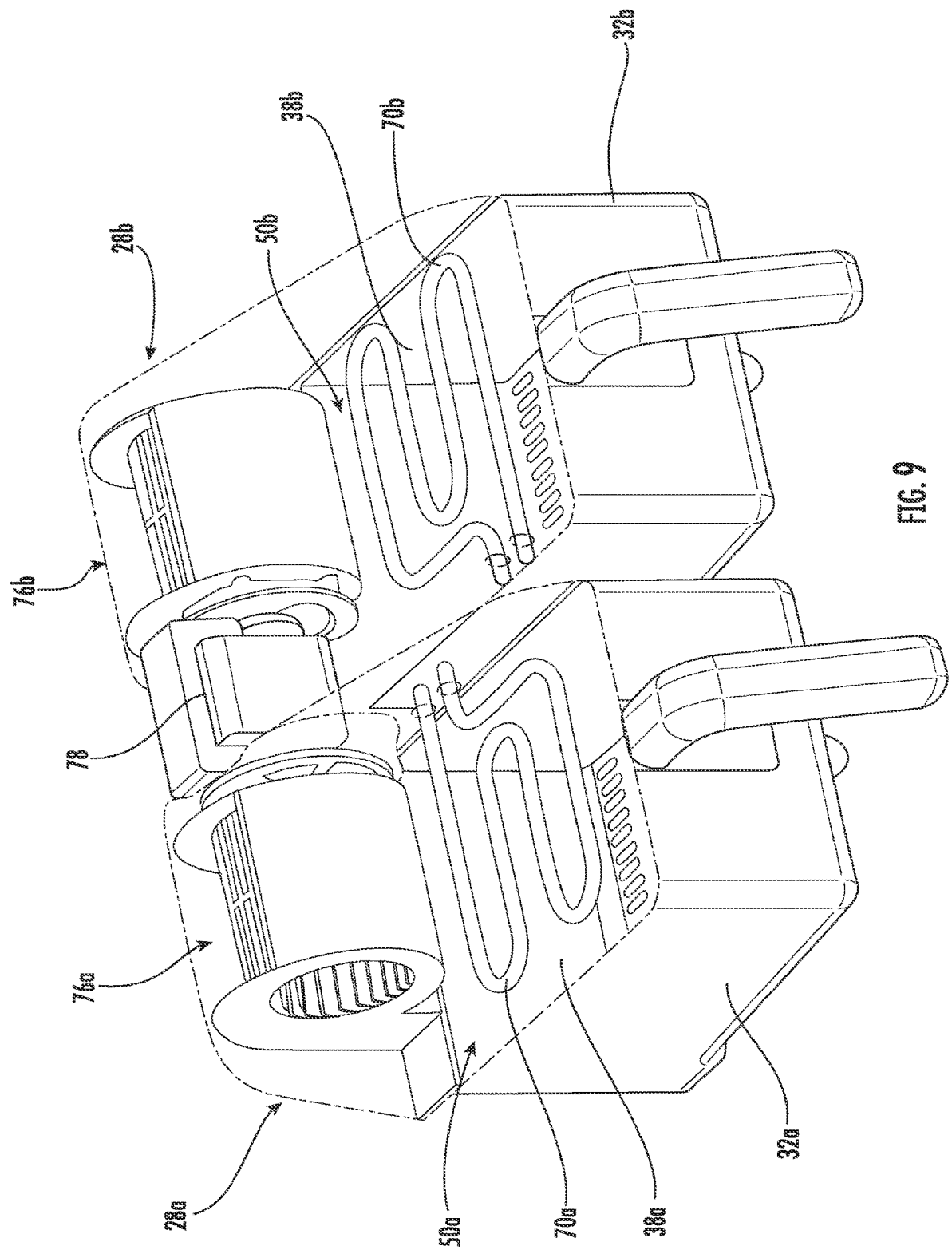
FIG. 9 is a front view of the portion of the cooking system of FIG. 8 according to an embodiment.
Figure 10:
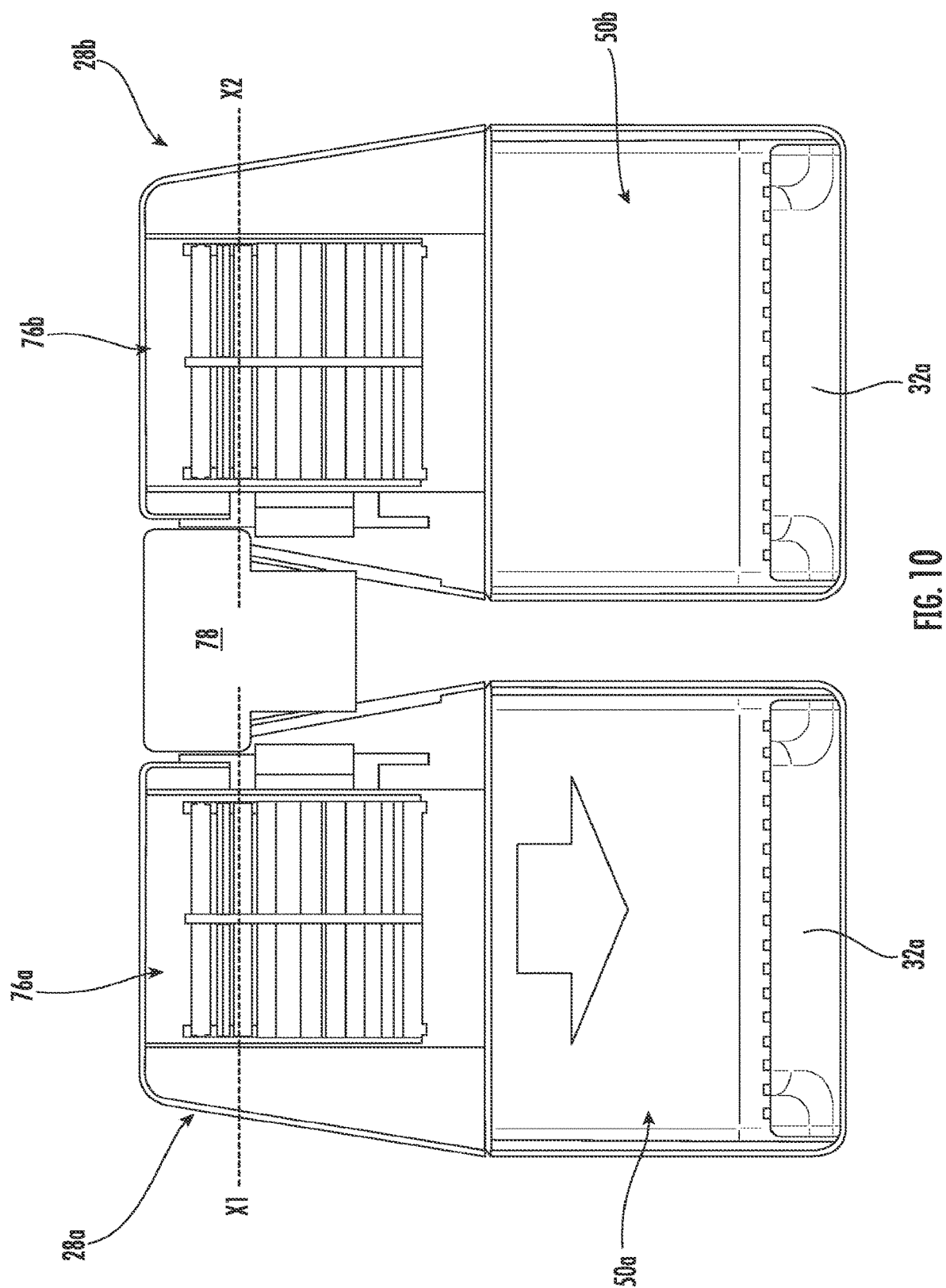
FIG. 10 is a rear perspective view of the portion of the cooking system of FIG. 8 according to an embodiment.
Figure 11:
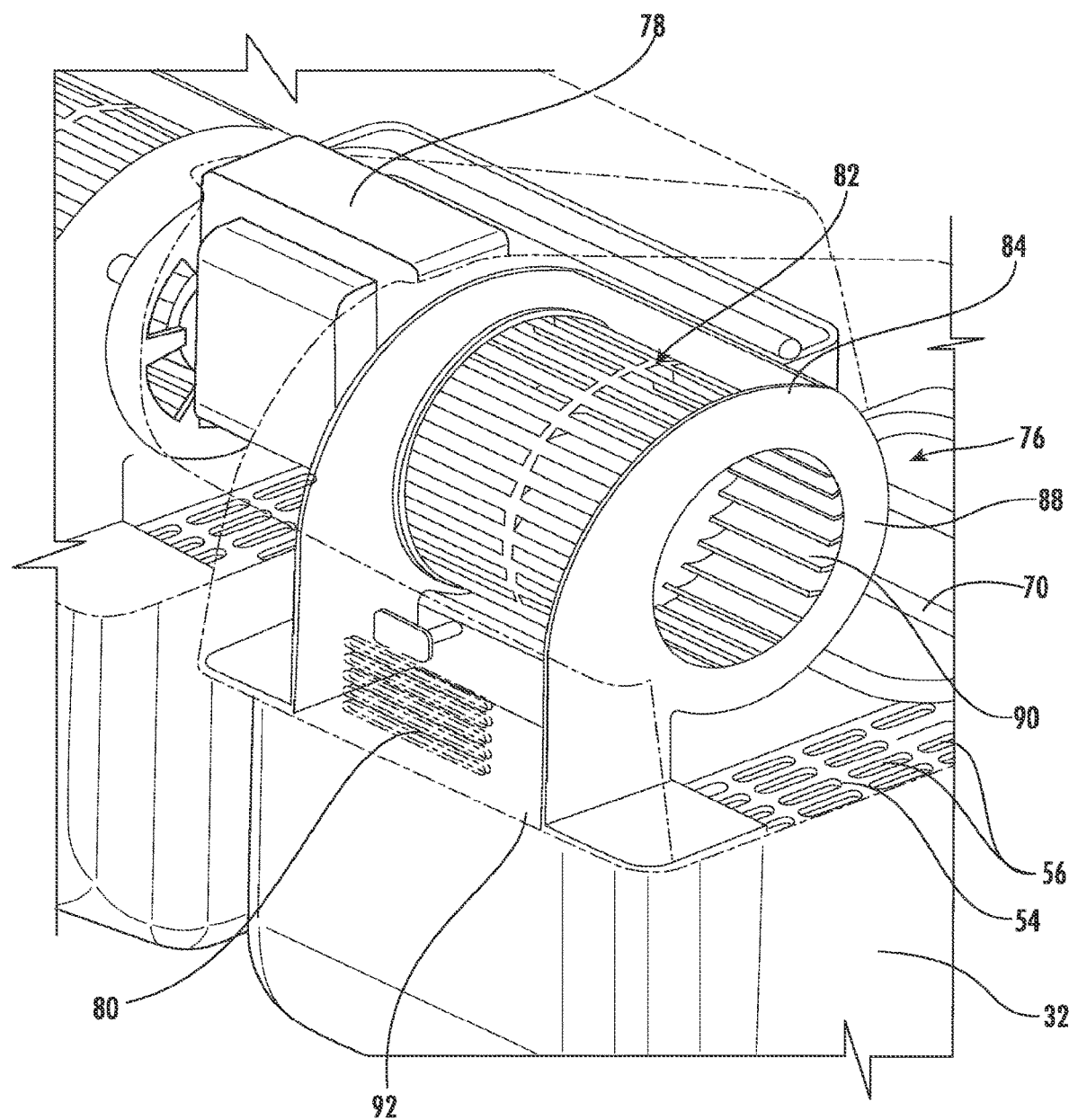
FIG. 11 is a perspective view of a motor of the cooking system of FIG. 8 according to an embodiment.
Figure 12:
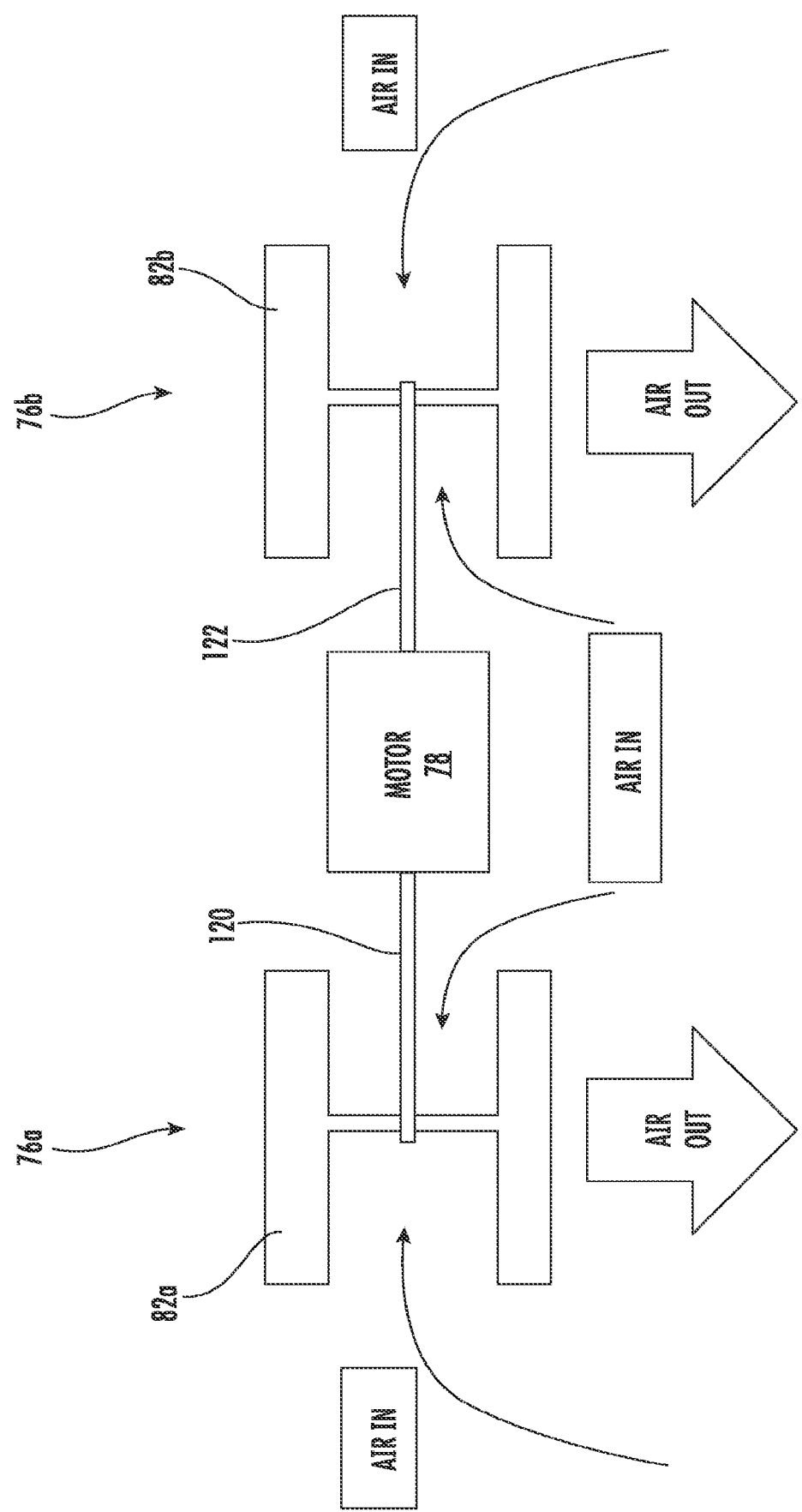
FIG. 12 is a schematic diagram of the motor and the air movement mechanisms of the cooking system according to an embodiment.
Figure 13:
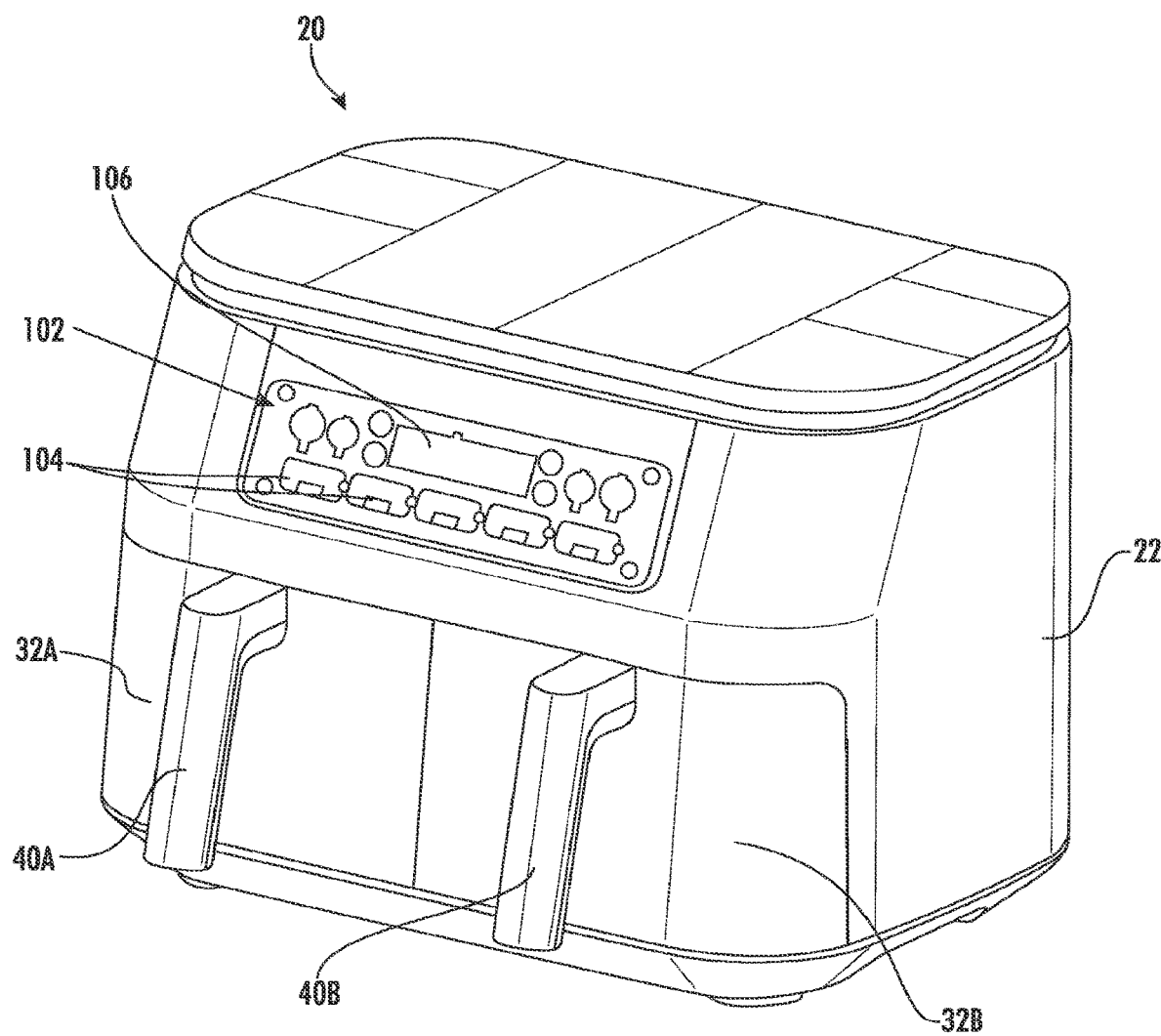
FIG. 13 is a perspective view of the cooking system according to another embodiment.
Figure 14:
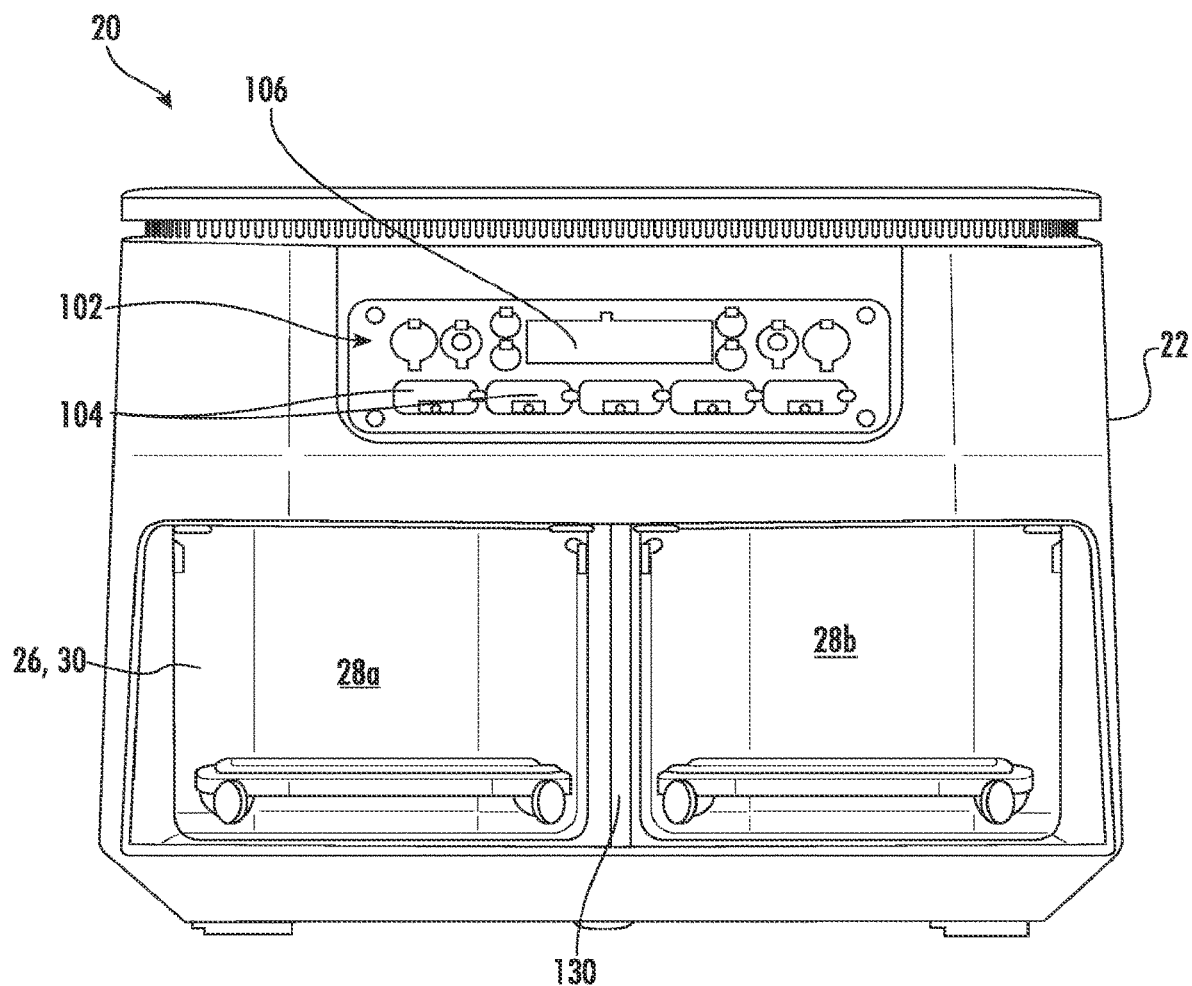
FIG. 14 is a plan view of the cooking system of FIG. 13, with the cooking containers removed according to an embodiment.

With reference now to FIGS. 8-15, in an embodiment of the cooking system 20, the housing 22 includes a plurality of internal compartments arranged within the interior of the housing 22. For example, as best shown in FIGS. 8, 14, and 15, the housing 22 is illustrated as having a first internal compartment 28a and a second internal compartment 28b, separated from one another at least in part by a divider or wall 130. The divider 130 extends vertically from a base of the housing or liner 30 and forms a sidewall of a bottom portion of two adjacent internal compartments 28a, 28b. In an embodiment, the divider 130 extends to a lower edge of an upper portion of each internal compartment 28a, 28b, the upper portion of each internal compartment containing the respective heating element 70a, 70b, and air movement mechanism 76a, 76b associated therewith. As shown, the plurality of internal compartments 28a, 28b (both the upper and lower portions) are fluidly separate from one another. Although two internal compartments 28a, 28b are illustrated and described herein, it should be understood that embodiments including any number of internal compartments, such as more than two compartments are also within the scope of the disclosure. The plurality of internal compartments 28a, 28b may be substantially similar in size and shape, or alternatively, may be different.

Each of the internal compartments 28a, 28b formed in the housing 22 may be substantially identical to the internal compartment 28 previously described with respect to FIGS. 1-6. More specifically, a respective cooking container 32a, 32b is insertable into each internal compartment 28a, 28b, and an insert 50a, 50b may be removably installed within the interior 38a, 38b of each cooking container 32a, 32b. In addition, each internal compartment 28a, 28b includes at least one heating element 70a, 70b and an air movement mechanism 76a, 76b configured to circulate air through the internal compartment 28a, 28b, respectively. The components associated with operation of each internal compartment, such as the heating element and air movement mechanism are also independently operable and fluidly separate from the components of the adjacent internal compartment.

In the non-limiting embodiment of FIGS. 14 and 15, each air movement mechanism 76a, 76b is illustrated as a fan wheel or impeller 82 that is configured to rotate about a generally vertically oriented axis. The air movement mechanisms 76a, 76b need not include a separate housing as previously described with respect to the embodiment of FIGS. 1-6. As shown, the air movement mechanisms 76a, 76b may be stacked vertically relative to the heating element 70a, 70b such that a flow of air is configured to flow from the heating element 70a, 70b directly to the air movement mechanism 76a, 76b sequentially. The axial flow of air provided to the inlet of the air movement mechanism 76a, 76b is expelled from the impeller 82a, 82b radially, adjacent the sides of the internal compartment 28. Although this configuration of the air movement mechanism 76a, 76b is illustrated with respect to an embodiment of the cooking system 20 including a plurality of fluidly distinct internal compartments 28a, 28b, it should be understood that such an air movement mechanism 76 may also be used in embodiments of the cooking system 20 including only a single internal compartment 28.

As noted above, the cooking system 20 includes a motor 78 located external to the internal compartment 28 and operable to rotate an air movement mechanism 76 about an axis of rotation X. In embodiments of the cooking system 20 including two distinct internal compartments, a single motor 78 may be used to drive both a first air movement mechanism 76a associated with the first internal compartment 28a and a second air movement mechanism 76b associated with the second internal compartment 28b. In such embodiments, the motor 78 may be disposed within the housing 22 between the first and second compartments 28a, 28b, such that the first air movement mechanism 76a is mounted to a first output shaft 120 extending from a first side of the motor 78 and the second air movement mechanism 76b is mounted to a second output shaft 122 extending from a second side of the motor 78. As a result, the first air movement mechanism 76a and the second air movement mechanism 76b may be positioned coaxially (see FIG. 10). However, embodiments, where the axis of rotation X1 of the first air movement mechanism 76a is offset from the axis of rotation X2 of the second air movement mechanism 76b are also contemplated herein.

Because a single motor 78 is used to drive the both the first and second air movement mechanisms 76a, 76b, in an embodiment, both the first and second air movement mechanisms 76a, 76b are driven about their axes, even when only one of the first and second internal compartment 28a, 28b is being used to perform a cooking operation. Accordingly, an air movement mechanism 76 may rotate about its axis even when the adjacent heating mechanism 70 associated therewith is non-operational. In other embodiments, the first and second air movement mechanisms 76a, 76b may be independently operable via a shared motor 78. Further, in an embodiment, the motor 78 is operable to rotate the first and second air movement mechanisms 76a, 76b, at the same speed. However, embodiments where the first and second air movement mechanisms 76a, 76b, are rotated at different speeds, such as via a coupling for example, are also within the scope of the disclosure.

However, it should be understood that embodiments of the cooking system 20 that include a separate motor associated with each internal compartment are also within the scope of the disclosure. For example, as shown in FIG. 15, the system 20 includes two separate motors 78a, 78b configured to operate the air movement mechanisms 76a, 76b associated with the first and second internal compartments 28a, 28b independently. In such embodiments, each motor 78a, 78b may be located external to the internal compartment 28, for example in a vertically stacked configuration relative to the heating elements 70a, 70b, and the air movement mechanisms 76a, 76b. In such embodiments, the motors 78a, 78b may be located near an upper end or top surface of the housing 22.

In embodiments of the cooking system 20 including a plurality of internal compartments, a single control system 108, as previously described with respect to FIG. 7, may be suitable to selectively perform one or more cooking operations associated with both the first internal compartment 28a and the second internal compartment 28b. Accordingly, the same inputs 104 may be used to provide control for the plurality of internal compartments 28a, 28b, or alternatively, distinct inputs 104 may be associated with each of the plurality of internal compartments 28a, 28b, respectively.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:
a housing having a first internal compartment and a second internal compartment, the first internal compartment and the second internal compartment being separated by a dividing wall extending upward from a base of the housing;
a first cooking container defining a first cooking volume, said first cooking container being removably receivable within said first internal compartment to completely close off an opening to said first internal compartment when fully inserted therein, and a second cooking container defining a second cooking volume, said second cooking container being removably receivable within said second internal compartment to completely close off an opening to said second internal compartment when fully inserted therein;
a first heating element and a second heating element disposed in said housing, said first heating element being in thermal communication with said first cooking volume and said second heating element being in thermal communication with said second cooking volume, the first and second heating elements being independently operable to independently cook food contained within the first and second cooking containers; and
a first fan and a second fan disposed in said housing, said first fan being in fluid communication with said first cooking volume and said second fan being in fluid communication with said second cooking volume.

2. The cooking system of claim 1, wherein said first cooking container and said second cooking container are individually insertable into said first internal compartment and said second internal compartment respectively.

3. The cooking system of claim 1, wherein said first internal compartment and said second internal compartment are fluidly separate.

4. The cooking system of claim 1, wherein said first fan is stacked vertically relative to said first heating element within said housing and said second fan is stacked vertically relative to said second heating element within said housing.

5. The cooking system of claim 1, wherein said first fan includes a first inlet, a second inlet, and an outlet, said first inlet and said second inlet being arranged in fluid communication with said outlet.

6. The cooking system of claim 1, wherein said first fan has a first axially oriented inlet and a first radially oriented outlet and said second fan has a second axially oriented inlet and a second radially oriented outlet.

7. The cooking system of claim 1, wherein said first cooking container includes a first handle and said second cooking container includes a second handle.

8. The cooking system of claim 1, further comprising a motor operably coupled to each of said first fan and said second fan.

9. The cooking system of claim 8, wherein said motor is located externally from said first internal compartment and said second internal compartment.

10. The cooking system of claim 8, wherein said motor is positioned between said first internal compartment and said second internal compartment.

11. The cooking system of claim 1, wherein the housing has a first opening extending into the first internal compartment and a second opening extending into the second internal compartment, and wherein said first cooking container is removably receivable within said first internal compartment to seal the first opening to said first internal compartment when inserted therein, and wherein said second cooking container is removably receivable within said second internal compartment to seal the second opening to said second internal compartment when inserted therein.

12. A cooking system, comprising:
a housing having a first internal cooking compartment with a first cooking container removably disposed therein and a second internal compartment with a second cooking container removably disposed therein, the first internal compartment including a first heating assembly comprising a first fan and a first heating element configured to cook food disposed in the first cooking container, and the second internal cooking compartment including a second heating assembly comprising a second fan and a second heating element configured to cook food disposed in the second cooking container, the first and second heating assemblies being independently operable to independently cook food contained within the first and second cooking containers, and the first and second heating assemblies being programmable to simultaneously cook food in separate cooking modes,
wherein the first and second internal cooking compartments are separated by a dividing wall extending upward from a base of the housing, wherein the first and second cooking containers are horizontally coplanar when disposed in the first and second internal cooking compartments respectively.

13. The cooking system of claim 12, wherein the first cooking container includes a first external handle attached thereto and the second cooking container includes a second external handle attached thereto.

14. The cooking system of claim 12, wherein the first internal cooking compartment and the second internal cooking compartment are independently operable to cook food using at least one of conduction, convection, radiation, and induction.

15. The cooking system of claim 12, further comprising a control system configured to operate the first and second heating assemblies, the control system being configured to receive inputs corresponding to at least one of a temperature, a cook time, and a food type.

16. The cooking system of claim 12, further comprising a motor operably coupled to each of the first and second fans, the motor configured to operate the first and second fans at the same speed or at different speeds.

17. The cooking system of claim 12, wherein the housing has a first opening extending into the first internal cooking compartment and a second opening extending into the second internal compartment, and wherein the first cooking container is configured to seal the first opening to said first internal cooking compartment when said first cooking container is disposed therein, and wherein the second cooking container is configured to seal the second opening to said second internal cooking compartment when said second cooking container is disposed therein.

18. A cooking system, comprising:
a housing having first and second internal independently removable cooking containers disposed therein, the first and second cooking containers being separated from each other by a dividing wall extending upward from a base of the housing, each of the first and second cooking containers defining a cooking volume therein, the first and second cooking containers being configured to engage with first and second respective channels inside the housing to define first and second respective air ducts therein;

first and second heating elements disposed in the housing adjacent the cooking volume of the first and second cooking containers, respectively, the first and second heating elements being independently operable; and first and second fans disposed in the housing adjacent the first and second heating elements, respectively, the first and second fans being independently operable, and the first and second fans being configured to circulate air through the first and second cooking volumes, respectively.

19. The cooking system of claim 18, further comprising a control system configured to operate cooking processes of food contained in the first and second cooking containers.

20. The cooking system of claim 19, wherein the control system is configured to independently operate the first and second heating elements and the first and second fans.

21. The cooking system of claim 19, wherein the control system is configured to receive inputs corresponding to at least one of a temperature, a cook time, and a food type.

22. The cooking system of claim 19, wherein the control system is configured to adjust cooking parameters based on sensed data without user input.

* * * * *